United States Patent
Herrou et al.

(10) Patent No.: US 12,022,097 B2
(45) Date of Patent: Jun. 25, 2024

(54) METHOD AND DEVICE FOR CODING AND DECODING DATA CORRESPONDING TO A VIDEO SEQUENCE

(71) Applicant: FONDATION B-COM, Cesson-Sevigne (FR)

(72) Inventors: Glenn Herrou, Cesson-Sévigné (FR); Wassim Hamidouche, Thorigné-Fouillard (FR); Luce Morin, Rennes (FR); Jean-Yves Aubie, Melesse (FR)

(73) Assignee: FONDATION B-COM, Cesson-Sevigne (FR)

( * ) Notice: Subject to any disclaimer, the term of this patent is extended or adjusted under 35 U.S.C. 154(b) by 341 days.

(21) Appl. No.: 17/427,526

(22) PCT Filed: Jan. 24, 2020

(86) PCT No.: PCT/FR2020/050101
§ 371 (c)(1),
(2) Date: Nov. 19, 2021

(87) PCT Pub. No.: WO2020/157413
PCT Pub. Date: Aug. 6, 2020

(65) Prior Publication Data
US 2022/0141475 A1 May 5, 2022

(30) Foreign Application Priority Data

Jan. 31, 2019 (FR) ........................................ 1900950

(51) Int. Cl.
*H04N 19/33* (2014.01)
*H04N 19/105* (2014.01)
(Continued)

(52) U.S. Cl.
CPC ........... *H04N 19/33* (2014.11); *H04N 19/105* (2014.11); *H04N 19/119* (2014.11);
(Continued)

(58) Field of Classification Search
CPC .... H04N 19/33; H04N 19/105; H04N 19/119; H04N 19/132; H04N 19/139; H04N 19/147; H04N 19/176; H04N 19/187
See application file for complete search history.

(56) References Cited

U.S. PATENT DOCUMENTS

2020/0186795 A1* 6/2020 Wang .................. H04N 19/132

FOREIGN PATENT DOCUMENTS

WO  2014/028404  2/2014

OTHER PUBLICATIONS

Boyce et al. Overview of SHVC: Scalable Extensions of the High Efficiency Video Coding Standard).*
(Continued)

*Primary Examiner* — Hesham K Abouzahra
(74) *Attorney, Agent, or Firm* — NIXON & VANDERHYE

(57) ABSTRACT

Disclosed is a method for encoding data corresponding to a video sequence, into a spatial resolution scalable binary flow, including a base layer and enhancement layer. The method includes, for a frame of the sequence: obtaining, from the frame, a first frame, partitioning the first frame into blocks, each block having a given size, and encoding a block of the first frame to generate the base layer; obtaining, from the frame, a second frame; partitioning the second frame into blocks by inferring the initial size of a block from the size of a corresponding block in the first frame, the block of the second frame having an initial spatial resolution; determining a spatial encoding resolution associated with the block from a set of predetermined spatial resolutions; and coding (Continued)

data representative of the at block, based on the determined spatial encoding resolution, to generate an enhancement layer.

20 Claims, 11 Drawing Sheets

(51) Int. Cl.
*H04N 19/119* (2014.01)
*H04N 19/132* (2014.01)
*H04N 19/139* (2014.01)
*H04N 19/147* (2014.01)
*H04N 19/176* (2014.01)

(52) U.S. Cl.
CPC ......... *H04N 19/132* (2014.11); *H04N 19/139* (2014.11); *H04N 19/147* (2014.11); *H04N 19/176* (2014.11)

(56) References Cited

OTHER PUBLICATIONS

Boyce et al. Overview of SHVC: Scalable Extensions of the High Efficiency Video Coding Standard) 2015 (Year: 2015).*
International Search Report for PCT/FR2020/050101 dated Apr. 23, 2020, 7 pages.
Written Opinion of the ISA for PCT/FR2020/050101 dated Apr. 23, 2020, 10 pages.
Boyce et al., "Overview of SHVC: Scalable Extensions of the High Efficiency Video Coding (HEVC) Standard", IEEE Transactions on Circuits and Systems for Video Technology, Jan. 1, 2015, XP055210971, (submission pending).
"Scalable HEVC (SHVC) Test Model 10 (SHM 10)", 112. MPEG Meeting Jun. 22, 2015-Jun. 26, 2015, Warsaw; (Motion Picture Expert Group or ISO/IEC JTC1/SC29/WG11), No. N15439, Oct. 18, 2015, XP030022159, (submission pending).
Auyeung et al., "A Use Case and High Level Syntax of SHVC: Scalability Based Region of Interest", 104. MPEG Meeting; Apr. 22, 2013-Apr. 26, 2013; Incheon; (Motion Picture Expert Group or ISO/IEC JTC1/SC29/WG11), No. m28740, Apr. 20, 2013; XP030057273, (submission pending).
Truong et al., "SVC CE8: Spatial scalability of multiple ROIs", 73.MPEG Meeting, Jul. 25, 2005-Jul. 29, 2005; Poznan; (Motion Picture Expert Group or ISO/IEC JTC1/SC29/WG11), No. M12321, Jul. 20, 2005; XP030041005, (submission pending).
Lee et al., "Scalable roi algorithm for H.264/SVC-based Video streaming", IEEE Transactions on Consumer Electronics, IEEE Service Center, New York, NY, US, vol. 57, No. 2, May 1, 2011, XP011335728, (submission pending).
Boyce et al., "Overview of SHVC: Scalable Extensions of the High Efficiency Video Coding (HEVC) Standard", IEEE Transactions on Circuits and Systems for Video Technology, Jan. 1, 2015, XP055210971, 15 pages.
Chen et al., "Scalable HEVC (SHVC) Test Model 10 (SHM 10)", 112. Mpeg Meeting Jun. 22, 2015-Jun. 26, 2015, Warsaw, Poland; (Motion Picture Expert Group or ISO/IEC JTC1/SC29/WG11), No. N15439, Oct. 18, 2015, XP030022159, 14 pages.
Cheung et al., "A Use Case and High Level Syntax of SHVC: Scalability Based Region of Interest", 104. MPEG Meeting; Apr. 22, 2013-Apr. 26, 2013; Incheon, KR; (Motion Picture Expert Group or ISO/IEC JTC1/SC29/WG11), No. m28740, Apr. 20, 2013; XP030057273, 4 pages.
Truong et al., "SVC CE8 report: Spatial scalability of multiple ROIs", 73.MPEG Meeting, Jul. 25, 2005-Jul. 29, 2005; Poznan, Poland; (Motion Picture Expert Group or ISO/IEC JTC1/SC29/WG11), No. M12321, Jul. 20, 2005; XP030041005, 20 pages.
Lee et al., "Scalable ROI Algorithm for H.264/SVC-Based Video Streaming", IEEE Transactions on Consumer Electronics, IEEE Service Center, New York, NY, US, vol. 57, No. 2, May 1, 2011, XP011335728, pp. 882-887.
International Telecommunication Union, "Series H: Audiovisual and Multimedia Systems Infrastructure of audiovisual services—Coding of moving video", Apr. 2015, Recommendation ITU-T H.265, 634 pages.

* cited by examiner

METHOD AND DEVICE FOR CODING AND DECODING DATA CORRESPONDING TO A VIDEO SEQUENCE

This application is the U.S. national phase of International Application No. PCT/FR2020/050140 filed Jan. 29, 2020 which designated the U.S. and claims priority to FR Patent Application No. 1900838 filed Jan. 30, 2019, the entire contents of each of which are hereby incorporated by reference.

BACKGROUND OF THE INVENTION

Field of the Invention

The present invention generally relates to the technical field of data rate compression for transmitting the video content of these data.

In particular, it relates to the so-called "scalable" compression consisting in using a base layer and one or several enhancement layers for compressing the data.

Description of the Related Art

The data representative of a video content can be compressed into a base layer and one or several enhancement layers. A scalable compression standard such as SHVC can be used. The latter is based on the principle of adaptation of a quantity from one layer to another. For example, this quantity may be the spatial resolution, each enhancement layer having a higher resolution than the previous one. This base layer/enhancement layers structure makes it possible to adapt the spatial resolution, for example as a function of the conditions of transmission of the flow.

The scalable compression standards, such as SHVC, as defined in the ITU-T document, H.265, *High efficiency video coding, April* 2015, implement a complex coding architecture causing very long process times and increased latency.

The invention proposes in particular to solve the above-mentioned problems.

SUMMARY OF THE INVENTION

In this context, the invention proposes a method for encoding data corresponding to a video sequence, into a spatial resolution scalable binary flow, comprising a base layer and at least one enhancement layer. The method comprises, for at least one frame of the video sequence,
  obtaining, from said frame, a first frame, partitioning the first frame into blocks, each block having a given size, and encoding at least one block of the first frame to generate the base layer,
  obtaining, from said frame, a second frame, the method further comprising
    partitioning the second frame into blocks by inferring the initial size of at least one of the blocks from the size of a corresponding block in the first frame, said at least one block of the second frame having an initial spatial resolution,
    determining a spatial encoding resolution associated with said at least one block from a set of predetermined spatial resolutions, and
    coding data representative of said at least one block, based on the determined spatial encoding resolution, to generate at least one enhancement layer.

The invention makes it possible, in a scalable compression scheme, to perform an adaptation of the spatial resolution at the frame block level. The blocks partitioning heterogeneous contents of a frame (for example, natural contents) can then be encoded using, for each of them, an adapted spatial encoding resolution. This offers a better rendering of the frame when the latter is decoded. Moreover, reusing decisions taken during the encoding of the base layer, and using at least one predetermined spatial resolution, provides an encoding method of very low complexity, with few calculations. In other words, the invention is not a standard encoding method, expensive in terms of calculation power, but a method of very low complexity and reduced latency.

Other non-limitative and advantageous features of the product/method according to the invention, taken individually or according to all the technically possible combinations, are the following.

Preferably, said set of predetermined spatial resolutions can include at least said initial spatial resolution.

Therefore, if the spatial encoding resolution corresponds to the initial spatial resolution, the processing of the block, and hence the number of calculations during the encoding thereof, is limited.

In a first embodiment, the step of determining the spatial encoding resolution of the block of the second frame can comprise
  evaluating the rate-distortion cost for said block for at least two predetermined spatial resolutions, and
  determining the spatial encoding resolution of the block of the second frame as a function of the evaluated rate-distortion costs.

This embodiment has a low complexity and allows several possible spatial resolutions to be tested, in order to be able to chose that which offers the best compromise between the required rate and the distortion resulting from the encoding. Limiting the number of spatial resolutions to be tested allows controlling the number of calculations.

The determined spatial encoding resolution can be associated with the lowest rate-distortion cost evaluated. This embodiment has for advantage to be particularly simple to implement.

The method can further comprises:
  analyzing the content of said block of the second frame, and
  selecting the predetermined spatial resolutions having a rate-distortion cost lower than a predetermined threshold, and if one of the selected spatial resolutions is adapted to the analyzed content of said block, the spatial encoding resolution is determined from said adapted spatial resolution, otherwise the spatial encoding resolution is determined from the selected predetermined spatial resolution having the lowest rate-distortion cost evaluated.

Moreover, the step of determining the spatial encoding resolution of the block of the second frame can further include
  selecting predetermined spatial resolutions having a rate-distortion cost lower than a predetermined threshold, and
  performing a comparison between said selected spatial resolutions and the spatial resolution of at least one encoded block belonging to the neighborhood of said block of the second frame, and if the result of the comparison fulfils a predetermined criterion, the spatial encoding resolution determined for said block is determined from the spatial resolution of the encoded block of the neighborhood, otherwise the spatial encoding resolution is determined from the selected predetermined spatial resolution having the lowest rate-distortion cost evaluated.

The step of determining the spatial encoding resolution of the block of the second frame can further comprise, if no spatial resolution is adapted to the analyzed content of said block, performing a comparison between said selected spatial resolutions and the spatial resolution of at least one encoded block of the neighborhood, and if the result of the comparison fulfils a predetermined criterion, the spatial encoding resolution for said block is determined from the spatial resolution of the encoded block of the neighborhood, otherwise the spatial encoding resolution is determined from the selected predetermined spatial resolution having the lowest rate-distortion cost evaluated.

The three examples mentioned hereinabove allow for the blocks belonging to areas of the frame having a homogeneous content in terms of details or contours to be allocated with the same spatial encoding resolution. Hence, the too frequent changes of spatial encoding resolution, which may impair the visual quality, are avoided.

According to another embodiment, the encoding of at least one block of the first frame can comprise
  obtaining, from a reference frame, at least one reference frame portion, called the first reference frame, and
  determining in the first reference frame, a first block, called prediction block, and a first motion vector pointing to the first prediction block, and/or the step of determining the spatial encoding resolution of said block of the second frame can comprise
    obtaining, from said reference frame, at least another reference frame portion, called the second reference frame,
    obtaining, from the first motion vector, a second motion vector pointing to a second block, called reference block, in said second reference frame, said second reference block being associated with one or several predetermined spatial resolutions, and
    determining the spatial encoding resolution of said block of the second frame from the one or several predetermined spatial resolutions of the second reference block.

This other embodiment has in particular two advantages, i.e. the temporal coherence of the resolution choices and a zero signaling cost, because the decoder can implement identical steps.

Said second reference block having a predetermined spatial resolution, the spatial encoding resolution of the block of the second frame can be inferred from said predetermined spatial resolution of the second reference block.

For example, the spatial encoding resolution of said block of the second frame can be determined from the majority predetermined spatial resolution associated with the second reference block.

In another example, if the proportion of a predetermined spatial resolution associated with the second reference block is higher than a predetermined threshold, the spatial encoding resolution of said block of the second frame can be determined from said predetermined spatial resolution, otherwise the spatial encoding resolution of said block of the second frame is determined from the majority predetermined spatial resolution associated with the second reference block.

The implementation of this predetermined threshold associated with a predetermined spatial resolution (for example, the initial spatial resolution) makes it possible to limit the risks of loosing important details of the frame.

The step of encoding said information representative of said at least one block of the second frame can comprise
  sub-sampling said at least one block of the second frame to obtain an intermediate block at a spatial encoding resolution, if the spatial encoding resolution is lower than the initial spatial resolution,
  over-sampling to said spatial encoding resolution the block of the first frame corresponding to said block of the second frame, if the spatial resolution of said block of the base layer is lower than said spatial encoding resolution of said second block of the second frame,
  determining data representative of said at least one block of the second frame as a function of the block of the first over-sampled frame and said at least one sub-sampled block of the second frame, and
  coding said information representative of said at least one block of the second frame.

The invention also proposes a method for decoding a spatial resolution scalable binary flow, comprising a base layer and at least one enhancement layer, including encoded data corresponding to a video sequence, the method comprising for at least one block of a frame of the video sequence
  decoding the data corresponding to the block for the enhancement layer to obtain decoded data representative of the block for the enhancement layer, and decoding spatial resolution information, representative of a spatial encoding resolution of said block for the enhancement layer,
  decoding the data corresponding to the block for the base layer to obtain a decoded block for the base layer,
  performing a first over-sampling of the decoded block for the base layer as a function of said decoded spatial resolution information,
  obtaining an intermediate decoded block for the enhancement layer from the decoded data representative of the block for the enhancement layer and of the over-sampled decoded block for the base layer, and
  performing a second over-sampling of the intermediate decoded block for the enhancement layer from said spatial resolution information to produce a final decoded block at a final spatial resolution, for the enhancement layer.

The invention also proposes a method for decoding a spatial resolution scalable binary flow, comprising a base layer and at least one enhancement layer, including encoded data corresponding to a video sequence, the method comprising for at least one block of a frame of the video sequence
  decoding the data corresponding to the block for the base layer to obtain a decoded block for the base layer,
  decoding the data corresponding to the block for the enhancement layer to obtain decoded data representative of the block for the enhancement layer, said decoding further comprising
    obtaining, from a reference frame, at least one reference frame portion, called the first reference frame,
    obtaining, from the binary flow, a first motion vector pointing to a first prediction block in the first reference frame,
    obtaining, from said reference frame, at least another reference frame portion, called the second reference frame, at least one block of which has a determined spatial resolution,
    obtaining, from the first motion vector, a second motion vector pointing to a second block, called reference block, in said second reference frame, determining a spatial encoding resolution of said block of the second frame from the spatial resolution of the second reference block, performing a first over-sampling of the decoded block for the base layer, function of the spatial encoding resolution, obtaining an intermediate decoded block at the spatial encoding resolution for the enhancement layer from the decoded data representative of the block for the enhancement layer and the over-sampled decoded block for the base layer, and performing a second over-sampling of the intermediate decoded block for the enhancement layer to produce a final decoded block at a final spatial resolution, for the enhancement layer.

The invention also proposes a device for encoding data corresponding to a video sequence, into a spatial resolution scalable binary flow, comprising a base layer and at least one enhancement layer, the device being configured to implement for at least one frame of the video sequence the operations of obtaining, from said frame, a first frame, partitioning the first frame into blocks, each block having a given size, and encoding at least one block of the first frame to generate the base layer, obtaining, from said frame, a second frame, the device being further configured to implement the operations of partitioning the second frame into blocks by inferring the initial size of at least one of the blocks from the size of a corresponding block in the first frame, said at least one block of the second frame having an initial spatial resolution, determining a spatial encoding resolution associated with said at least one block from a set of predetermined spatial resolutions, and coding data representative of said at least one block, based on the determined spatial encoding resolution, to generate at least one enhancement layer.

The invention also proposes a device for decoding a spatial resolution scalable binary flow, comprising a base layer and at least one enhancement layer, including encoded data corresponding to a video sequence, the device being configured to implement for at least one block of a frame of the video sequence the operations of decoding the data corresponding to the block for the enhancement layer to obtain decoded data representative of the block for the enhancement layer, and decoding spatial resolution information, representative of a spatial encoding resolution of said block for the enhancement layer, decoding data corresponding to the block for the base layer to obtain a decoded block for the base layer, performing a first over-sampling of the decoded block for the base layer as a function of said decoded spatial resolution information, obtaining an intermediate decoded block for the enhancement layer from the decoded data representative of the block for the enhancement layer and of the over-sampled decoded block for the base layer, and performing a second over-sampling of the intermediate decoded block for the enhancement layer from said spatial resolution information to produce a final decoded block at a final spatial resolution, for the enhancement layer.

The invention also proposes a device for decoding a spatial resolution scalable binary flow, comprising a base layer and at least one enhancement layer, including encoded data corresponding to a video sequence, the device being configured to implement for at least one block of a frame of the video sequence the operations of decoding the data corresponding to the block for the base layer to obtain a decoded block for the base layer, decoding the data corresponding to the block for the enhancement layer to obtain decoded data representative of the block for the enhancement layer, said step of decoding device being further configured to implement the operations of obtaining, from a reference frame, at least one reference frame portion, called the first reference frame, obtaining, from the binary flow, a first motion vector pointing to a first prediction block in the first reference frame, obtaining, from said reference frame, at least another reference frame portion, called the second reference frame, at least one block of which has a determined spatial resolution, obtaining, from the first motion vector, a second motion vector pointing to a second block, called reference block, in said second reference frame, determining a spatial encoding resolution of said block of the second frame from the spatial resolution of the second reference block, performing a first over-sampling of the decoded block for the base layer, function of the spatial encoding resolution, obtaining an intermediate decoded block at the spatial encoding resolution for the enhancement layer from the decoded data representative of the block for the enhancement layer and the over-sampled decoded block for the base layer, and performing a second over-sampling of the intermediate decoded block for the enhancement layer to produce a final decoded block at a final spatial resolution, for the enhancement layer.

Of course, the different features, alternatives and embodiments of the invention can be associated with each other according to various combinations, insofar as they are not mutually incompatible or exclusive.

BRIEF DESCRIPTION OF THE DRAWINGS

Moreover, various other features of the invention will be apparent from the appended description made with reference to the drawings that illustrate non-limitative embodiments of the invention, and wherein.

DESCRIPTION OF THE PREFERRED EMBODIMENTS

Of course, various other modifications can be brought to the invention within the framework of the appended claims.

Figure 1:
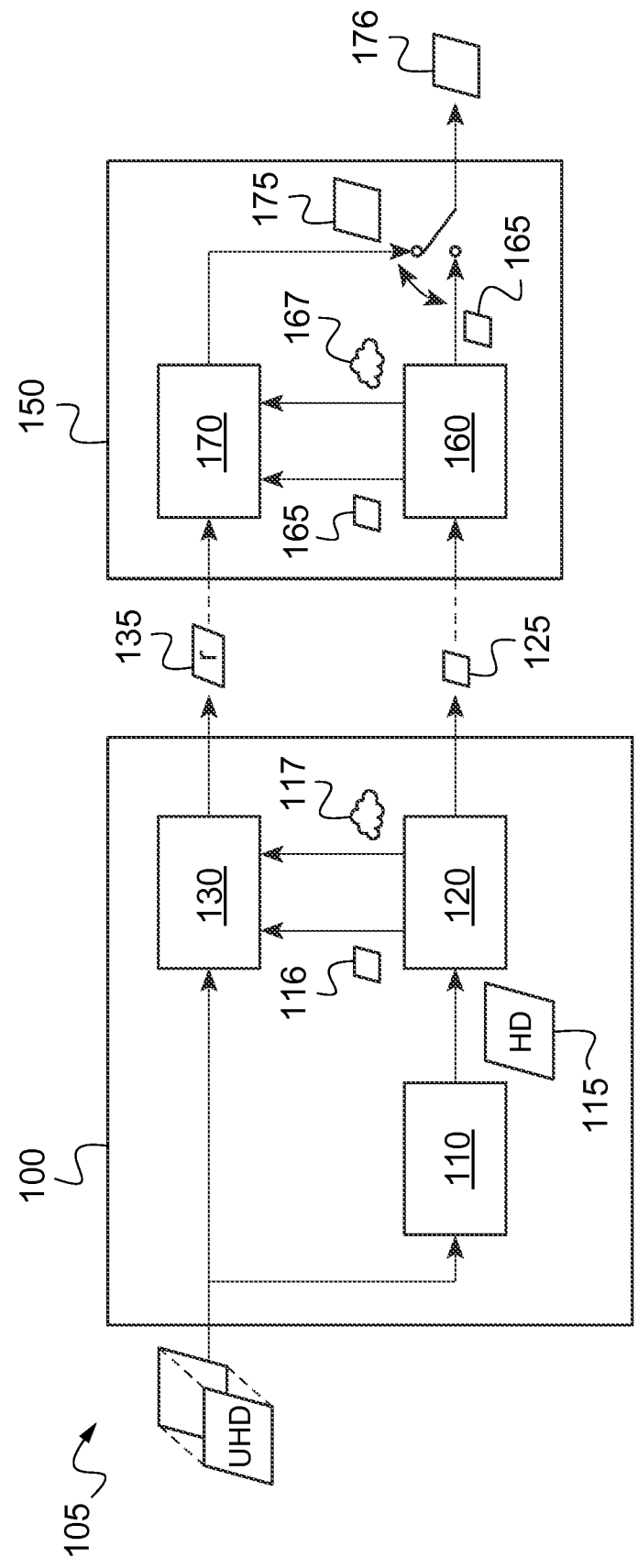
FIG. 1 is a view of an encoding device and a decoding device according to an embodiment of the invention.

FIG. 1 shows a system consisted of an encoder 100 and a decoder 150 for the video compression into a base layer and one or several enhancement layers. It is considered here that an enhancement layer has a higher spatial resolution than the base layer and the previous enhancement layer. The encoder 100 receives as an input frames 105 forming a video sequence. For example, these frames have a high resolution UHD, for ultra-high resolution, corresponding to 3840 pixels×2160 pixels.

A UHD frame is provided at the input of a module 110 that will sub-sample it and produce a frame 115 with a lower resolution than the input frame (here, high definition, HD, corresponding to 1920 pixels×1080 pixels).

As an alternative, the frames 105 can for example be in the so-called 8 k format (7680 pixels×4320 pixels) and sub-sampled to the UHD format.

The encoding of the sub-sampled frame 115 makes it possible to obtain encoded data for the base layer. For that purpose, the frame 115 is partitioned into blocks, each block being encoded by an encoding module 120 (for example corresponding to an encoding module of the HEVC type), according to an encoding standard known from the person skilled in the art, for example HEVC. The reference 125 symbolizes an encoded block for the base layer, output by the encoding module 120.

The UHD frame is also provided at the input of another encoding module 130 for the encoding of the data forming an enhancement layer. In this example, only one enhancement layer is considered, an encoding device for several enhancement layers being easily deducible from this example by multiplying the encoding modules for the different enhancement layers.

This other encoding module 130 receives as an input encoding information 117 of the base layer encoding module 120. This encoding information 117 as explained in more detail hereafter comprises in particular a size of a block of the base layer. The other encoding module 130 can partition the UHD frame into different blocks whose initial size is inferred from the size of the block of the base layer.

If the base layer comprises blocks of different sizes, the initial size of a block for the enhancement layer is inferred from the size of the corresponding block for the base layer.

Figure 4:
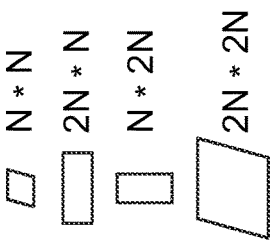
FIG. 4 illustrates a base layer and an enhancement layer corresponding to a frame of a video sequence.

As illustrated in FIG. 4, a corresponding block 415 for a base layer 405 has a same spatial position as a considered block 435 of an enhancement layer 425.

The other encoding module 130 includes means for determining a spatial resolution for the blocks of the enhancement layer. These means are adapted to determine the spatial resolution of a block from a set of predetermined spatial resolutions.

The spatial resolution of a block represents a number of pixels in the block. It is generally expressed as the product between the number of pixels in a first direction (horizontal, for example) and the number of pixels in a second direction (vertical, for example). The initial spatial resolution of a block corresponds to the number of pixels in a block, at the end of the partitioning of the frame into blocks. The spatial resolution of the block can be modified by being sub- or over-sampled in one or two directions. For example, the initial spatial resolution of a block for the enhancement layer can be of 2N pixels×2N pixels (where N=8, for example). If the block is sub-sampled in the vertical direction, a spatial resolution 2N*N is obtained for the block.

Figure 5:
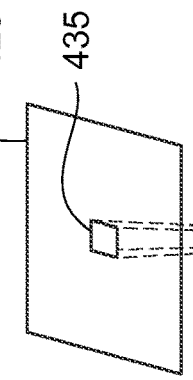
FIG. 5 illustrates an example of a set of possible spatial resolutions for a block of a frame.

FIG. 5 illustrates examples of spatial resolutions that may belong to the above-mentioned set of spatial resolutions. Four different examples of spatial resolutions are represented for one block (N*N, 2N*N, N*2N and 2N*2N), where N is an integer that represents a number of pixels.

Reference is made again to FIG. 1. The other encoding module 130 is configured to determine a residue relating to a difference between the considered block for the enhancement layer and a corresponding block that has been reconstructed (i.e. encoded then decoded according to a method well known from the person skilled in the art) 116 provided by the base layer encoding module 120. This residue is encoded and produced at the output of the encoder 135.

The decoder 150 receives as an input a binary flow comprising encoded data representative of UHD frames 105. A decoding module 160, adapted to decode data encoded according to the standard used by the encoder 100, decodes encoded blocks 125 for the base layer and produces decoded blocks 165 at the HD resolution. The decoded block 165 here corresponds to the block 116 reconstructed after encoding for the base layer.

Another decoding module 170 is adapted to decode a binary flow comprising encoded data corresponding to the residues 135 for the enhancement layer. The decoding module 170 provides a decoded block 175 at the UHD resolution, based on the corresponding decoded block 165 for the base layer, and to the decoded data relating to the residue 135.

To provide the decoded block 175, the other decoding module 170 can also receive as an input encoding information 167 from the decoding module 160 for the base layer. As an alternative, this encoding information 167 can be obtained from the binary flow provided at the input of the other decoding module 170.

As a function of the level of spatial resolution desired by a final user, the decoder 150 provides a decoded block 176 corresponding to the block having a higher (UHD) 175 or a lower (HD) 165 spatial resolution.

Figure 2:
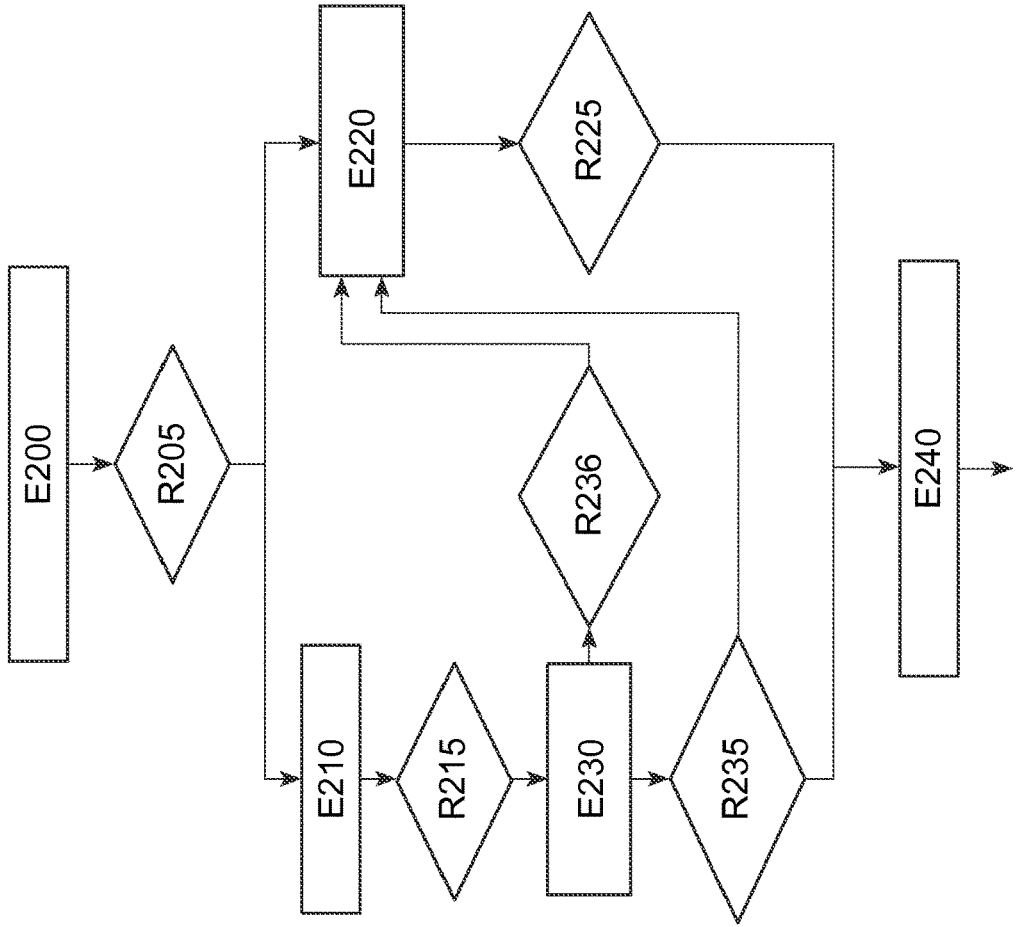
FIG. 2 illustrates a method for encoding data corresponding to a video sequence according to an embodiment of the invention.

FIG. 2 illustrates an example of an encoding method according to the invention, implemented by the encoder 100 of FIG. 1.

A first step E200 comprises receiving frames having a higher spatial resolution (for example, UHD). In a step E210, these UHD frames R205 are sub-sampled in order to obtain frames R215 having a lower spatial resolution (for example, HD). The word frame is to be interpreted here in the broad sense. It can denote a frame with several components in the case of a frame in the YCbCr format, for example, or a single one of these components, or also a spatial sub-part (or portion) of a frame with several components or of one of its components.

At least one sub-sampled frame R215 is partitioned into blocks then encoded block-by-block in a step E230 to generate the base layer R235.

The frames (at least one) having the higher spatial resolution R205 are partitioned into blocks and encoded block-by-block during an encoding step E220 to generate the data of the enhancement layer. This step E220 also uses encoding information R236 that comprises block size information for the base layer. This encoding information R236 is used for the partitioning into blocks during the encoding step E220 for the enhancement layer, the initial size of a block for the enhancement layer being inferred from the size of the corresponding block for the base layer.

The encoding of a block for the enhancement layer also comprises determining the spatial resolution of the block as explained in more detail with reference to FIG. 6.

For each block of the encoded enhancement layer, a residue is obtained, based on the difference between the block for the enhancement layer and a corresponding block for the base layer R235. This residue is encoded and produced at the output of the encoding step E225.

The encoded residues for the enhancement layer R226 and the encoded blocks of the base layer are then transmitted to a receiver coupled to the decoder in a step E240. The data for the base layer and the enhancement layer can be transported jointly on a same distribution network or on two distinct networks that could be of different nature. For example, the encoded data relating to the base layer can be transported in terrestrial digital broadcast, whereas the encoded data relating to the enhancement layer(s) would be transmitted via an Internet connection to receivers capable of operating at higher spatial resolutions.

Figure 3:
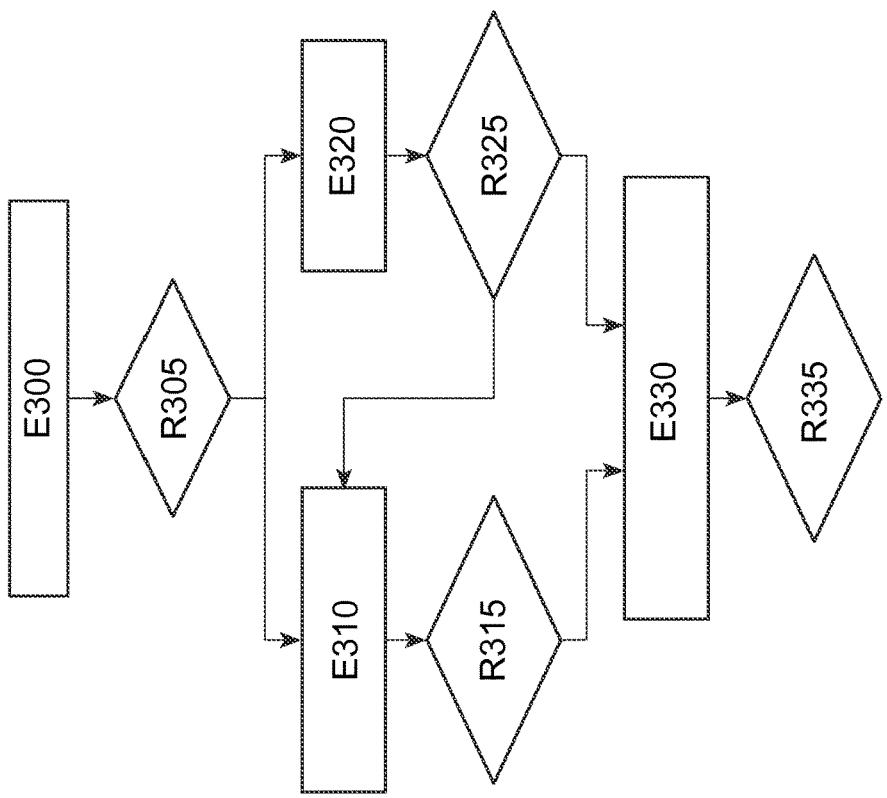
FIG. 3 illustrates a method for decoding a binary flow corresponding to a video sequence according to an embodiment of the invention.

FIG. 3 illustrates an example of a method for decoding a binary flow comprising encoded data representative of a video sequence according to the invention. This method can be implemented by the decoder 150 of FIG. 1.

In a first step E300, encoded data R305 are obtained, for example via a receiver adapted to receive a spatial resolution scalable binary flow. A step E320 allows a decoding of the data representative of the base layer to produce frames R235 of the video sequence at the lower spatial resolution HD.

In another step E310, the data representative of the enhancement layer among the obtained data R305 are decoded by means of the decoded HD frames R325, as explained in more detail hereinafter.

At the end of this decoding step E310 are produced frames R315 of the video sequence at the higher spatial resolution UHD.

Finally, a selection E330 is performed to choose a video sequence R335 as a function the user's constraints.

Figure 6:
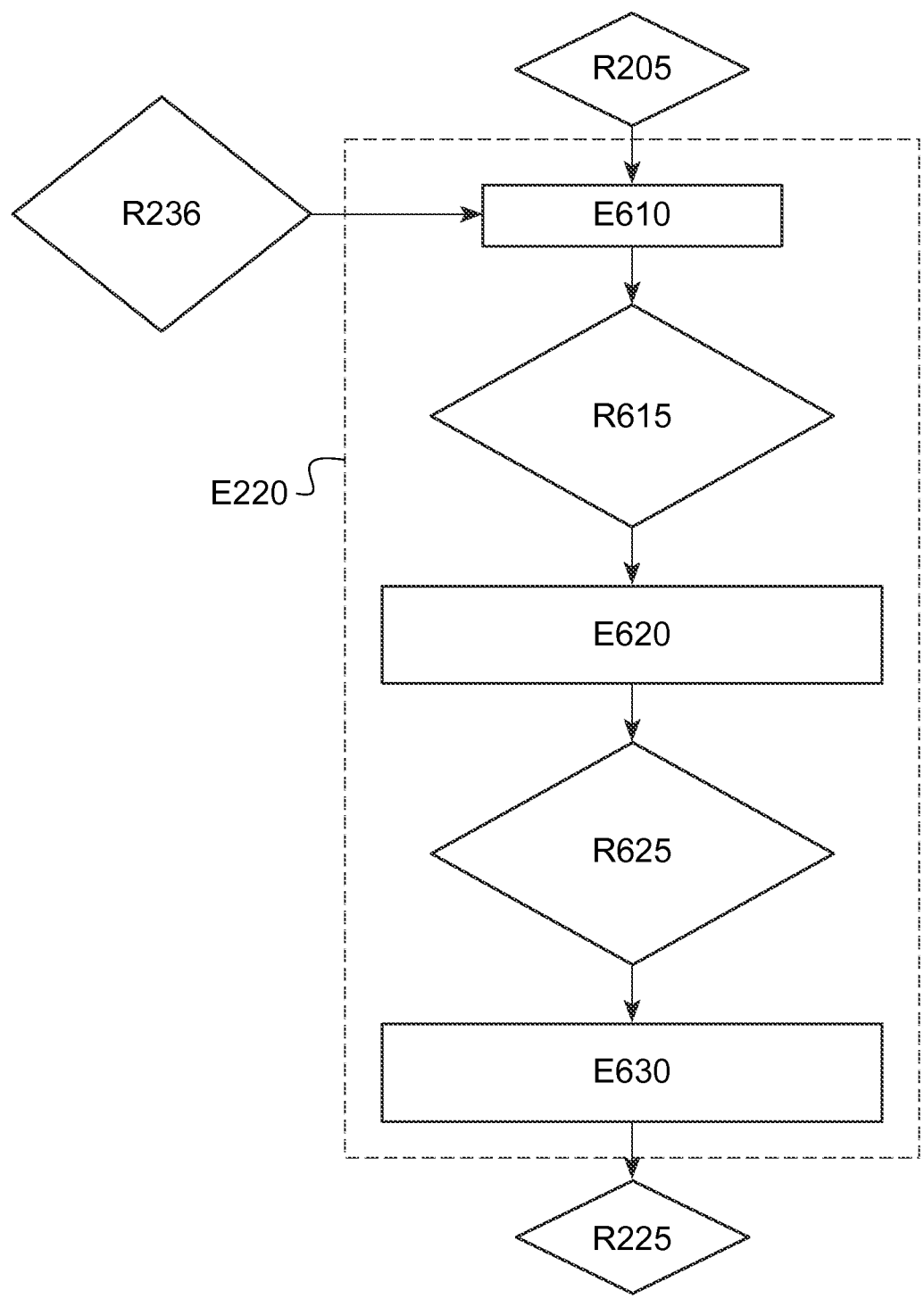
FIG. 6 illustrates in more detail the encoding method according to an embodiment of the invention.

FIG. 6 details the step of encoding a block for the enhancement layer E220. A frame of higher spatial resolution (UHD in this example) R205 is considered. The latter is partitioned into blocks in a step E610, where the initial size of the blocks is inferred from the size of the corresponding blocks in the base layer R236. Each block resulting from the partitioning has an initial spatial resolution.

For at least one block E615 resulting from the partitioning step E610, a spatial encoding resolution is then determined in a step E620. This spatial encoding resolution R625 is determined from a set of spatial encoding resolutions as detailed in FIGS. 8 and 10 hereinafter, each describing an embodiment of this determination step E620.

The spatial encoding resolution can be different from the initial resolution of a block, because more adapted to the content of the block and/or closer to the spatial resolutions of the neighboring blocks resulting in a greater homogeneity in the rendering of the frame and/or having a lower rate and distortion cost.

A residue representative of the block for the enhancement layer and information relating to the spatial encoding resolution are then encoded in a step E630 as explained with reference to FIG. 2. Encoded residue and spatial encoding resolution information R225 are obtained for the related block. The steps E620 and E630 can be repeated for each block resulting from the partitioning (or only a part) of each frame of the video sequence.

Figure 7:
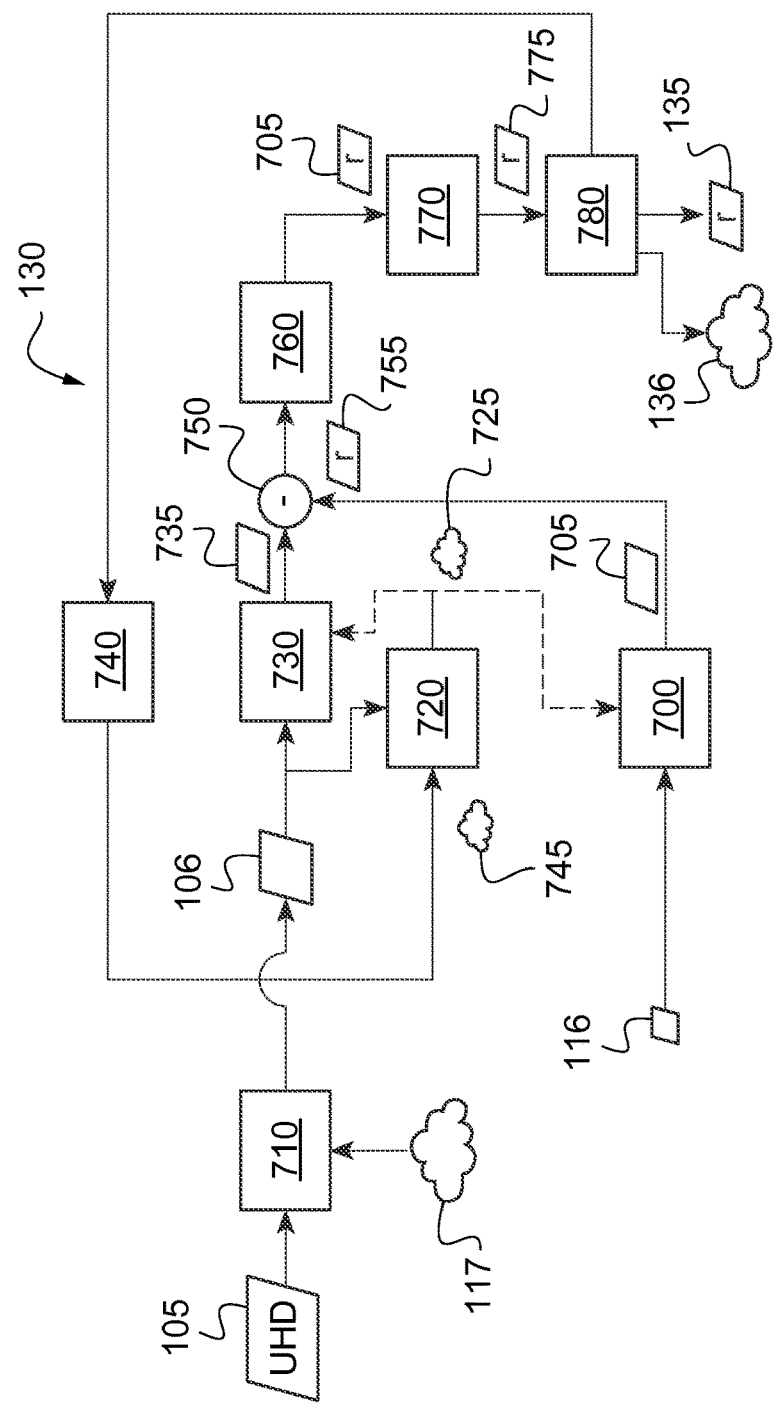
FIG. 7 illustrates a first variant of a module for the encoding device according to a first embodiment of the invention.
Figure 8:
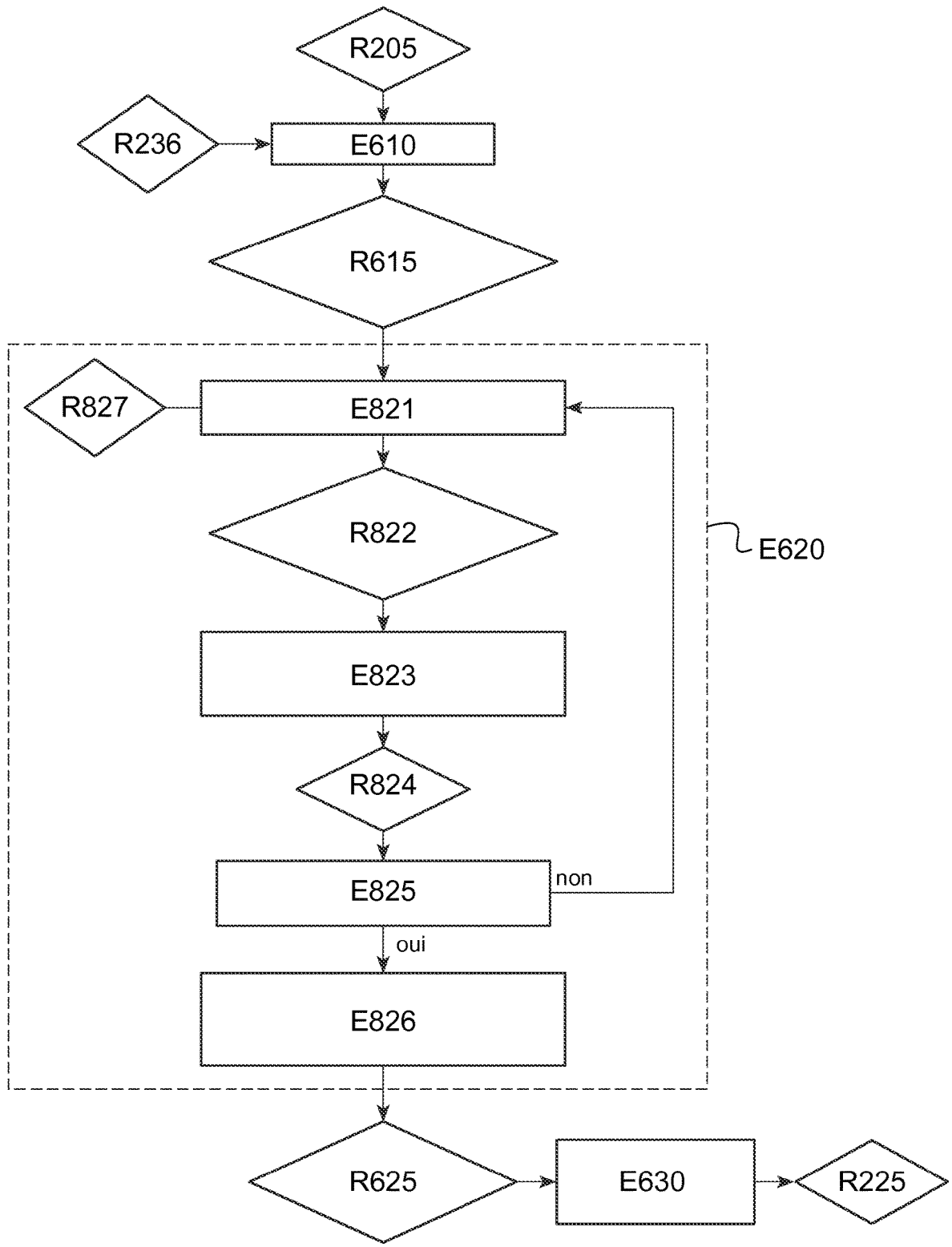
FIG. 8 illustrates an example of the encoding method that can be implemented by the first variant of the encoding module.

Reference is now made to FIG. 7 that illustrates a first embodiment of the decoding module 130 for the enhancement layer of the frames. FIG. 8 described hereinafter describes a first embodiment that can be implemented by this decoding module.

A frame of higher spatial resolution 105 is provided at the input of a block partitioning module 710. This partitioning is made as a function of the size 117 of the corresponding blocks of the base layer.

A block 106 is sent to a means 720 for determining the spatial encoding resolution of the block.

The block 106 has an initial spatial resolution resulting from the partitioning. For example, this initial spatial resolution is 2N*2N.

The determination means 720 receives as an input an instruction of spatial encoding resolution to be tested 745 from a decision module 740. This functional module is meant to choose the spatial resolution offering the best rate-distortion compromise. In a first step, the decision module 740 sends successively the instruction to encode the considered block 106, chosen among the set containing the predetermined possible spatial resolutions. In the following of the description, it is considered that the spatial resolutions to be tested are the four resolutions shown in FIG. 5. This allows for sufficient possibilities to adapt the spatial resolution of the block for the enhancement layer as close as possible to the frame content, while limiting the number of calculations to be performed by the enhancement layer encoding module 130. As a function of the encoding constraints and/or the frame to be encoded, it is possible to reduce or increase the number of spatial resolutions to be tested.

The decision module 740 is adapted to estimate the rate cost and the distortion associated with each of these tested spatial resolutions. For that purpose, the spatial resolution to be tested 725 is transmitted to the encoding chain 730-780.

A first module 730 is a sub-sampling module that sub-samples the block 106 if the spatial resolution to be tested 725 is lower than an initial spatial resolution that is here the maximum possible spatial resolution for the block 106. A possibly sub-sampled block 735 is produced as an output.

A residue 755 is generated by a subtraction module 750 from the sub-sampled block 735 and a block to be subtracted 705 obtained from the block of the base layer corresponding to the considered block 106 for the enhancement layer. The block to be subtracted 705 is provided by an over-sampling module 700 adapted to over-sample the corresponding block of the base layer 116 if the spatial resolution to be tested 725 is higher than the spatial resolution of the corresponding block 116. The subtraction module 750 produces a residue 755.

The functional modules 760, 770 and 780 can be identical to modules that can be found in the base layer encoding module 120. They have for object to process and encode, in the chosen spatial resolution to be tested, the residues resulting from the difference between the source block coming from the enhancement layer and the decoded block coming from the base layer.

A transformation module 760 is configured to produce a block 765 of coefficients by applying a transformation, for example a DCT ("Discrete Cosinus Transform"), well known from the person skilled in the art, to the residue 755.

A quantization module 770 is adapted to quantize the coefficients, here uniformly. The result 775 is then encoded by an entropic encoding module 780 to produce the encoded residue 135.

The entropic encoding module 780 is in this embodiment coupled to the decision module 740 in order to provide it encoding information for the tested spatial resolution. The decision module can hence calculate the rate cost and the distortion for the tested spatial resolution.

Hence, in a second step, once all the spatial resolutions tested, the decision module 740 is adapted to determine the optimum resolution in terms of rate-distortion cost that is the spatial encoding resolution for the considered block 106. This encoding resolution (for example, 2N*N) is transmitted to the determination module 720 for the later to initiate the final encoding loop with the spatial encoding resolution making it possible to obtain the output binary flow representing the considered block of the frame to be encoded. The entropic encoding module 780 produces the encoded residue 135 and encoded information 136 representative of the spatial encoding resolution.

As an alternative, the determination module 720 can also be configured to refine the decision taken by the decision module 740 during rate-distortion cost study. For that purpose, this module 740 is configured to analyze both data representative of the content of the considered block 106 (for example, using a gradient analysis within a block) and/or for example the resolution chosen during the previous encoding of the neighboring blocks to the considered block. Based on this analysis, the instruction of spatial encoding resolution 725 transmitted to the encoding loop for the final encoding can be different from that obtained by the decision module 720 after the rate-distortion cost evaluation. Indeed, for the considered block, if the cost associated with the resolution chosen for a neighboring block is close to the optimum cost found, this resolution will be preferred to that having the optimum cost. That way, the blocks belonging to areas of the frame having a homogeneous content in terms of details or contours will be allocated with the same spatial encoding resolution. Thus, the too frequent changes of encoding resolution, which may impair the visual quality, are avoided.

FIG. 8 shows a flow diagram for a first embodiment of an encoding method according to the invention, in particular for generating the enhancement layer.

As already explained with reference to FIG. 6, a frame of higher resolution is received, R205, and is partitioned into blocks, step E610, the initial size of at least one block being inferred from the size of the corresponding block in the base layer R236.

For at least one resulting block R615, the determination of its spatial encoding resolution, step E620, comprises a step E821 of choosing a first spatial encoding resolution to be tested. This choice is performed among a set of predetermined spatial resolutions R827. For example, these predetermined spatial resolutions can include the four spatial resolutions shown in FIG. 5. For a chosen spatial resolution to be tested R822, an encoding of the block of the enhancement layer is performed in a step E823. An encoded residue R824 is obtained for the chosen spatial resolution that has been tested. If other spatial resolutions have still to be tested, step E825, the steps E821, E823 and E825 are repeated until all the spatial resolutions to be tested have been tested.

Then, in a step E826, a spatial encoding resolution for the block of the enhancement layer is selected. The selection can be performed based on a rate and distortion cost criterion associated with the encoding for a chosen spatial resolution. The spatial encoding resolution can be that generating the lowest rate and distortion cost. But the selection can be made based on additional criteria, as described hereinabove. For example, an analysis of the considered block content can be made (by detecting boundaries in the frame block). A spatial resolution better adapted to this content (for example, a so-called "horizontal" spatial resolution 2N*N to come in superimposition on a vertical boundary detected in the frame block) can be determined. In this case, if the rate and distortion cost difference between the adapted spatial resolution and the tested spatial resolution having the lowest rate-distortion cost for the considered block is lower than a predetermined threshold, the spatial resolution adapted to the content will be preferred to be the spatial encoding resolution of the considered block for the enhancement layer.

According to another example, the spatial resolution of one or several neighboring blocks can be obtained (for example, the top and/or left adjacent neighbor), and if the rate and distortion cost difference between the spatial resolution of the neighboring block and the tested spatial resolution having the lowest rate-distortion cost for the considered block is lower than a predetermined threshold and if, for example, a content analysis (contour and texture detection) reveals a similarity between the neighboring block and the considered block, the spatial resolution of the neighbor will be preferred to be the spatial encoding resolution of the considered block. This example makes it possible to improve the homogeneity within a frame, by favoring the same spatial resolutions for neighboring blocks.

According to a last example, the different criteria can be studied successively, in order to favor for the considered block first a spatial encoding resolution adapted to the content, then, if not appropriate, a spatial encoding resolution homogeneous to that of the neighbors thereof, then, if the threshold criterion and/or a content similarity criterion is not fulfilled, the spatial resolution having the lowest rate and distortion cost. The order of the first two criteria linked to the content and to the neighborhood of the considered block, respectively, can be interchanged.

Finally, a spatial encoding resolution R625 is obtained. The considered block for the enhancement layer is encoded as a function of this spatial encoding resolution during step E630 to produce the encoded residue R225.

Figure 9:
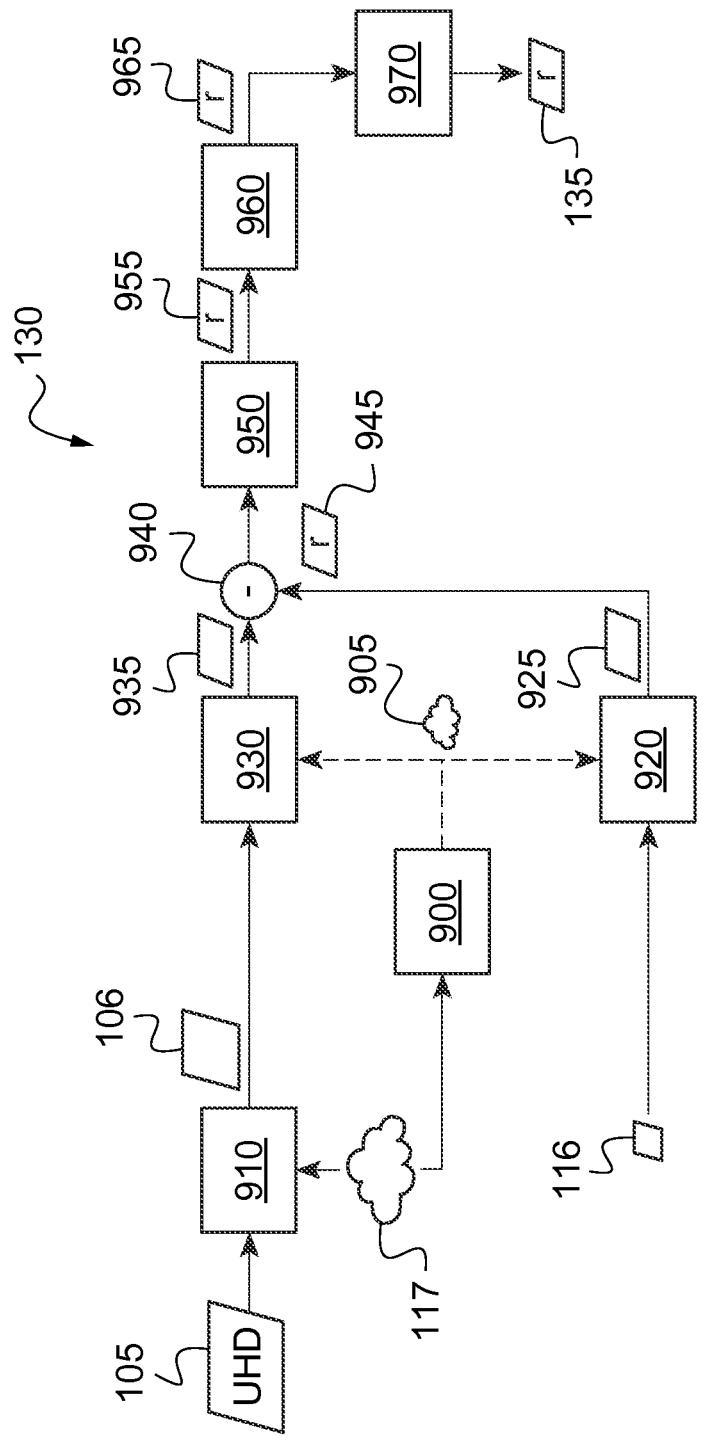
FIG. 9 illustrates a second variant of a module for the encoding device according to a second embodiment of the invention.

The following FIGS. 9 et 10 relates to a second embodiment of an encoding module 130 and a second embodiment of an encoding method that can be implemented in the module of FIG. 9, respectively.

Thus, reference is now made to FIG. 9 that illustrates the second embodiment of the encoding module 130 for the enhancement layer of the frames.

As in the first embodiment, a partitioning module 910 cuts into blocks a frame 15 at the higher spatial resolution, by inferring an initial size of the blocks from the size of the corresponding blocks for the base layer 117.

A determination module 900 receives from the base layer encoding module 120 a motion vector 117 pointing to a first reference block in a first reference frame, this first reference block being used for the encoding of the corresponding block 116. More precisely, the encoding of the corresponding block can integrate a prediction to predict all or part of the data of this block 116 from the reference block, according to so-called INTER prediction modes well known from the person skilled in the art. For example, the reference frame can be the base layer of another frame temporally preceding the considered frame 105.

The motion vector comes for the information 117 transmitted by the base layer encoding module 120 to the enhancement layer encoding module 130. It is scaled in such a way as to point to a second reference block in a second reference frame corresponding to an enhancement layer of the first reference frame. The scaled motion vector then points to a second reference block in the second reference frame.

Figure 11:
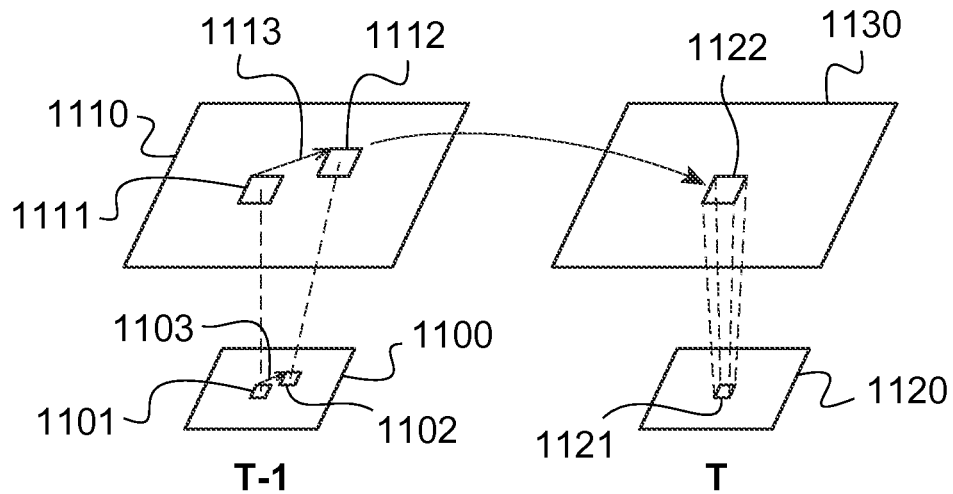
FIG. 11 illustrates a motion vector in a base layer and in an enhancement layer corresponding to a reference frame.

This principle is illustrated in FIG. 11. A frame, represented by a base layer 1120 and an enhancement layer 1130, is considered at a time T. The base layer 1120 comprises a block 1121 (corresponding for example to the block 116 of FIG. 9) corresponding to a block 1122 in the enhancement layer 1130. The reference frame for encoding this frame at time T is the frame of the same video sequence at T-1.

This reference frame includes a base layer 1100 and an enhancement layer 1110. The base layer 1100 includes a source reference block 1102 used to predict the block 1121 of the frame at time T. The motion vector is a vector 1103 pointing to the source reference block 1102 from a block 1101 at the same spatial position as the block to be predicted 1121 but in the base layer 1100 of the reference frame. This first, scaled motion vector 1103 gives a second motion vector 1113 pointing from a block 1111 corresponding to block 1101, to a second reference block 1112 for the enhancement layer.

It is to be noted that the reference frame can be a portion of the frame already encoded at time T, for example when the encoding includes a prediction mode called "INTRA Block Copy".

Reference is again made to FIG. 9. The determination module 900 is configured to obtain from the information 117, the spatial resolution of the second reference block to which the scaled motion vector points, in accordance with the principle explained with reference to FIG. 11. This spatial resolution of the second block is a predetermined spatial resolution.

For example, if the second reference block overlaps several blocks in the second reference frame, defined during the previous encoding of the second reference frame, these blocks having different spatial resolutions (forming a set of predetermined spatial resolutions), in this case the spatial encoding resolution of the considered block 106 can be inferred from the majority spatial resolution.

For example, if among the different spatial resolutions, the presence of one of the spatial resolutions (for example 2N*2N) is higher than a predetermined rate (for example, 30%), this spatial resolution can be preferred to infer the spatial resolution of the considered block 106.

Once a spatial encoding resolution 905 obtained by the determination module 900, it is used to encode the considered block 106, using the encoding loop 940-970, which may be similar to that used to encode a block of a base layer.

A first module 930 is a sub-sampling module that sub-samples the block 106 if the spatial encoding resolution 905 is lower than an initial spatial resolution that is here the maximum possible spatial resolution for the block 106. A possibly sub-sampled block 935 is produced as an output.

A residue 945 is generated by a subtraction module 940 from the sub-sampled block 935 and a block to be subtracted 925 obtained from the block of the base layer corresponding to the considered block 106 for the enhancement layer. The block to be subtracted 925 is provided by an over-sampling module 920 adapted to over-sample the corresponding block of the base layer 116 if the spatial encoding resolution 905 is higher than the spatial resolution of the corresponding block 116. The subtraction module 940 produces a residue 945.

The functional modules 950, 960 and 970 can be identical to modules that can be found in the base layer encoding module 120. They have for object to process and encode, in the spatial encoding resolution, the residues resulting from the difference between the source block coming from the enhancement layer and the decoded block coming from the base layer.

A transformation module 950 is configured to produce a DCT coefficients block 955 by applying a DCT ("Discrete Cosinus Transform"), well known from the person skilled in the art, to the residue 945.

A quantization module 960 is adapted to quantize the coefficients, here uniformly. The result 965 is then encoded by an entropic encoding module 970 to produce the encoded residue 135.

It is to be noted that the first or the second embodiment of the encoding method can be used to encode a complete video sequence. They can also both be used for a same video sequence, the first mode being preferred for the so-called INTRA frames and the second for the so-called INTER frames, implementing temporal prediction between two successive frames. To implement this last solution, the resulting device will have to implement in series the two structures shown in FIGS. 7 and 9.

As an alternative, the second embodiment of the method (FIG. 8) can be coupled to another compression mode for the enhancement layers, such as SHVC, wherein either mode can be selected according to the type of frame considered.

Figure 10:
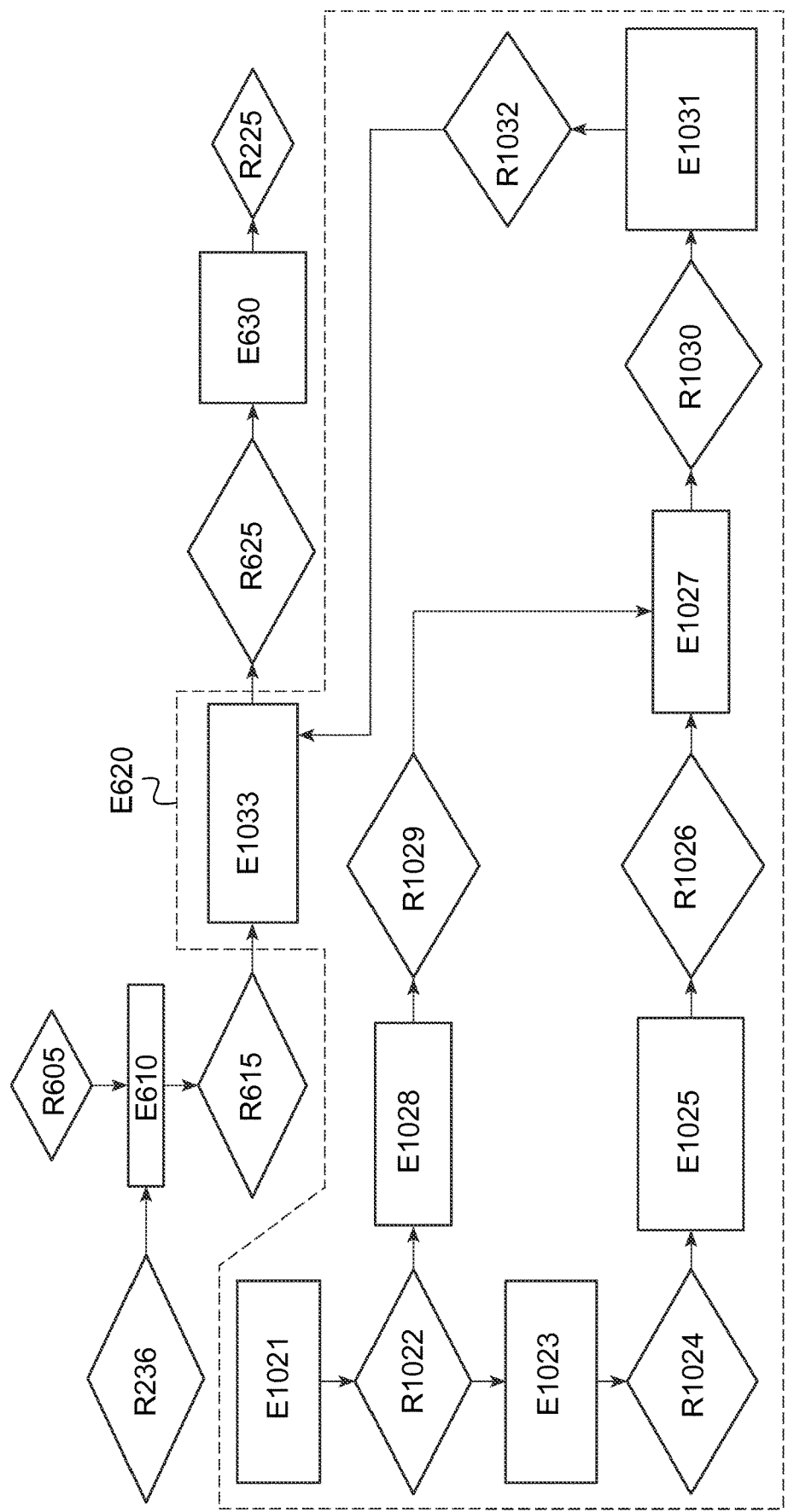
FIG. 10 illustrates an example of the encoding method that can be implemented by the second variant of the encoding module.

Reference is made to FIG. 10 that describes the steps of a second embodiment of encoding of a block for the enhancement layer.

As described hereinabove, a frame R605 of high spatial resolution is partitioned, step E610, using the size of the corresponding blocks for the base layer R236. For at least one resulting block R615, an encoding step E620 comprises a step E1033 of determining the spatial encoding resolution of the block.

The determination of the spatial encoding resolution receives as an input several predetermined spatial resolutions R1032, determined based on a first reference frame R1022 obtained during a step E1021. This first reference frame can be the base layer of the frame of the video sequence considered at the previous time (T-1). A first motion vector R1024 is obtained at step E1023, this first motion vector pointing to a first reference block serving for the prediction of the block of the base layer corresponding to the considered block R615.

This first motion vector is scaled, step E1025, in such a way as to have a second motion vector R1026 pointing to a second reference block in a second reference frame R1029 obtained during a step E1028. This second reference frame corresponds, in this example, to the enhancement layer of the frame of the video sequence considered at the previous time (T-1). We hence have a second reference block R1030, at step E1027, in the second reference frame R1029.

Based on this second reference block R1030, several spatial resolutions R1032 are obtained, associated with this second reference frame, at step E1030, as explained hereinabove with reference to FIG. 9.

The spatial encoding resolution is determined at step E1033 from the received spatial resolutions R1032.

Hence, as explained hereinabove, several spatial resolutions R1032 being received (due to the fact that the second reference block contains several different spatial resolutions), the spatial encoding resolution determined for the considered block R615 can be inferred from the spatial resolution that is in majority at step E1033.

Moreover, if among the different spatial resolutions, the presence of one of the spatial resolutions (for example, 2N*2N) is higher than a predetermined rate (for example, 30%), this spatial resolution can be preferred at step E1033 to infer the spatial resolution of the considered block R615.

The determined spatial encoding resolution R615 is used to encode the block for the enhancement layer at step E1033. Finally, the encoded residue R225 is produced.

Figure 12:
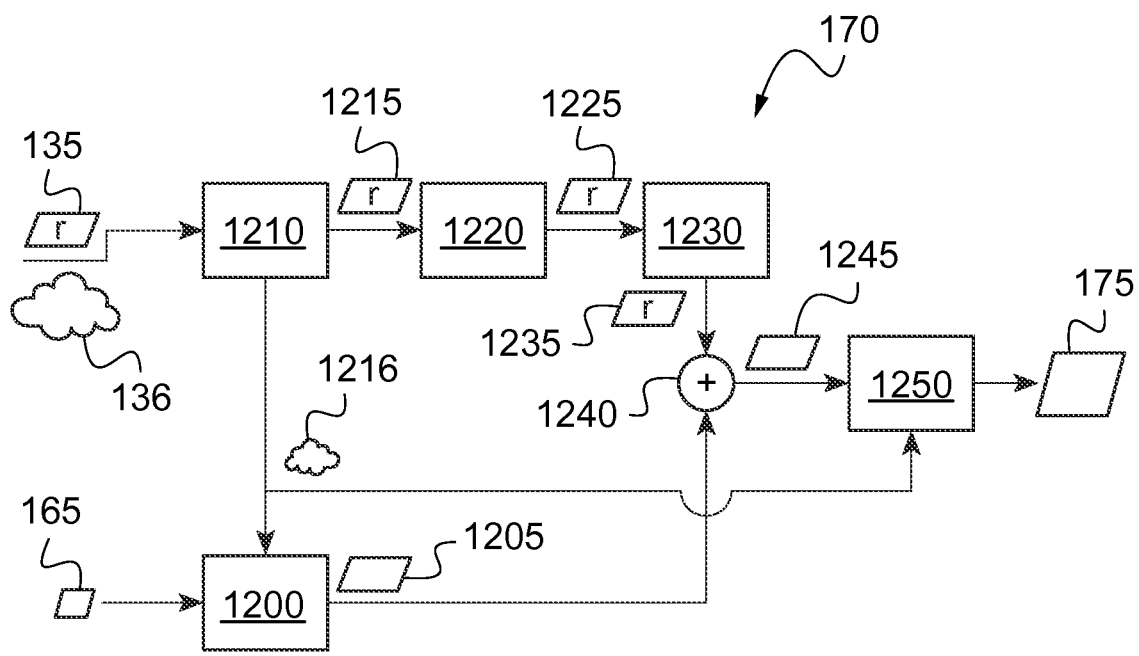
FIG. 12 illustrates a first variant of a decoding device according to a first embodiment of the invention.
Figure 13:
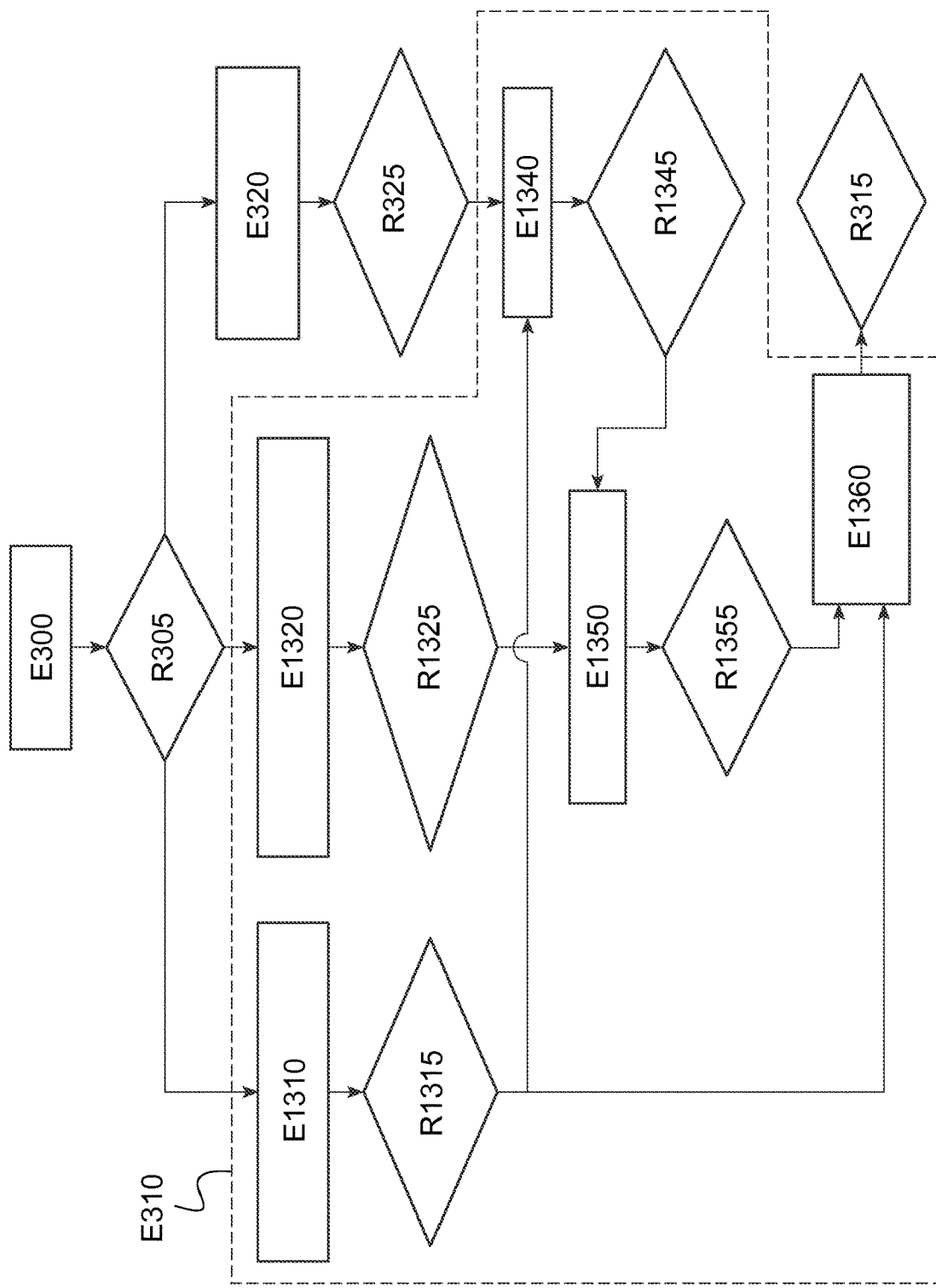
FIG. 13 illustrates an example of the decoding method that can be implemented by the first variant of the decoding module.

FIGS. 12 and 13 relate to a first embodiment of an enhancement layer decoding module and a decoding method that can be implemented by the first embodiment of the decoding module, respectively.

FIG. 12 shows a decoding module 170 of a decoder 150, according to a first embodiment of the invention. This first embodiment corresponds to the case in which the corresponding encoder 100 includes an entropic decoding module 780 adapted to generate encoded information representative of a spatial encoding resolution for at least one block, as illustrated in FIG. 7.

The decoding module 150 receives as an input a residue 135 representative of a block for the enhancement layer and the encoded information 136 representative of the spatial encoding resolution for this block. A decoding module 1210 performs an entropic decoding of the residue 135 to produce a decoded residue 1215 as well as decoded information 1216 including the spatial encoding resolution information associated with the block associated with the residue 135.

An inverse quantization module 1220 is adapted to perform an inverse quantization on the decoded residue 1215, in order to produce a dequantized residue 1225. An inverse transformation module 1230 is adapted to apply an inverse transform (for example, an inverse DCT if a DCT is applied at the encoder 100) on the dequantized residue to generate a residual block 1235 transmitted at the input of an adder 1240. This adder 1240 also receives as an input a block 1205 delivered by an over-sampling module 1200.

This module 1200 receives as an input the spatial encoding resolution 1216. It oversamples a decoded block 165 for the base layer corresponding to the considered block for the enhancement layer, at this spatial encoding resolution 1216.

The adder 1240 can produce a decoded intermediate block 1245, at the spatial encoding resolution.

Another over-sampling module 1250 is configured to over-sample the intermediate block to a final spatial resolution, if it is different from the spatial encoding resolution 1216, in order to obtain a final decoded block 175 for the enhancement layer at the final spatial resolution corresponding to the initial spatial resolution at the encoder (2N*2N in our example).

FIG. 13 shows a flow diagram of a first embodiment of the decoding E310 of a block for the enhancement layer, that can be implemented in a decoding module 170 as illustrated in FIG. 12.

As already mentioned with reference to FIG. 3, encoded data R305 are received at step E300. Then for at least one block of the base layer, the encoded data representative of this block are decoded at step E320 to obtain a decoded block R325 for the base layer.

Step E310 relates to the decoding of the data representative of the corresponding block for the enhancement layer.

A step E1310 comprises decoding the information containing the spatial encoding resolution R1315 associated with the considered block. A step E1320 comprises the decoding of the data representative of the considered block for the enhancement layer. These decoded data R1325 are added at step E1350 with the data of an over-sampled decoded block R1345 for the base layer obtained during a step E1340 of over-sampling the decoded block for the base layer R325.

An intermediate block R1355 at the spatial encoding resolution is obtained. It is over-sampled at step 1360 if the spatial encoding resolution is different from the final spatial resolution of the block for the enhancement layer.

A final decoded block for the enhancement layer, at the final spatial resolution, is obtained.

Figure 14:
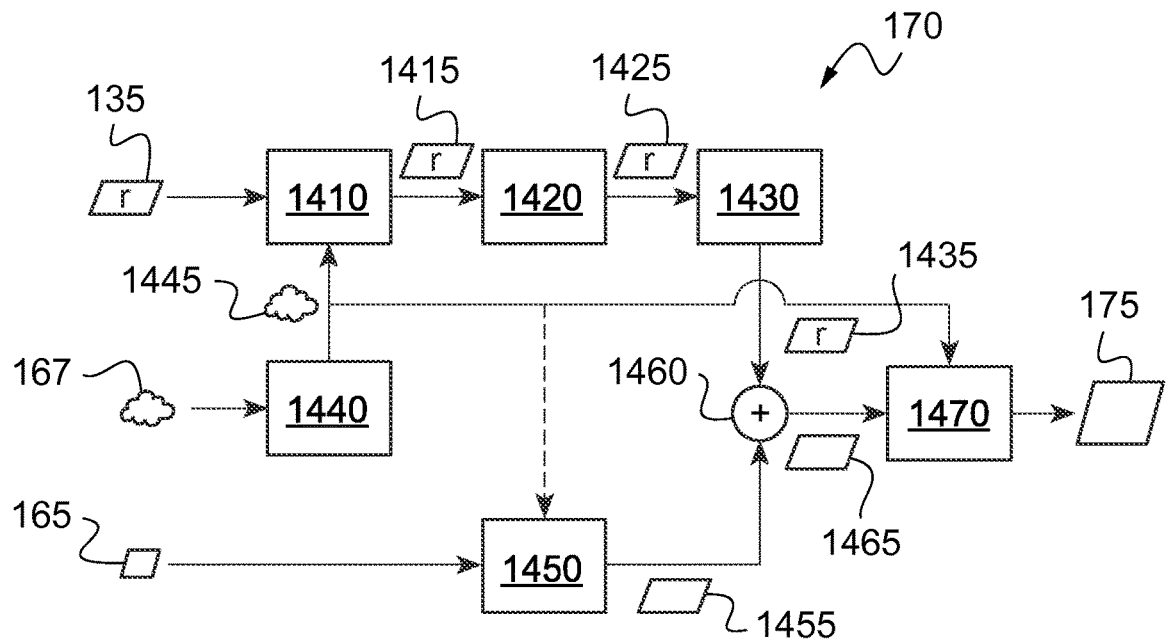
FIG. 14 illustrates a second variant of a decoding device according to a second embodiment of the invention.
Figure 15:
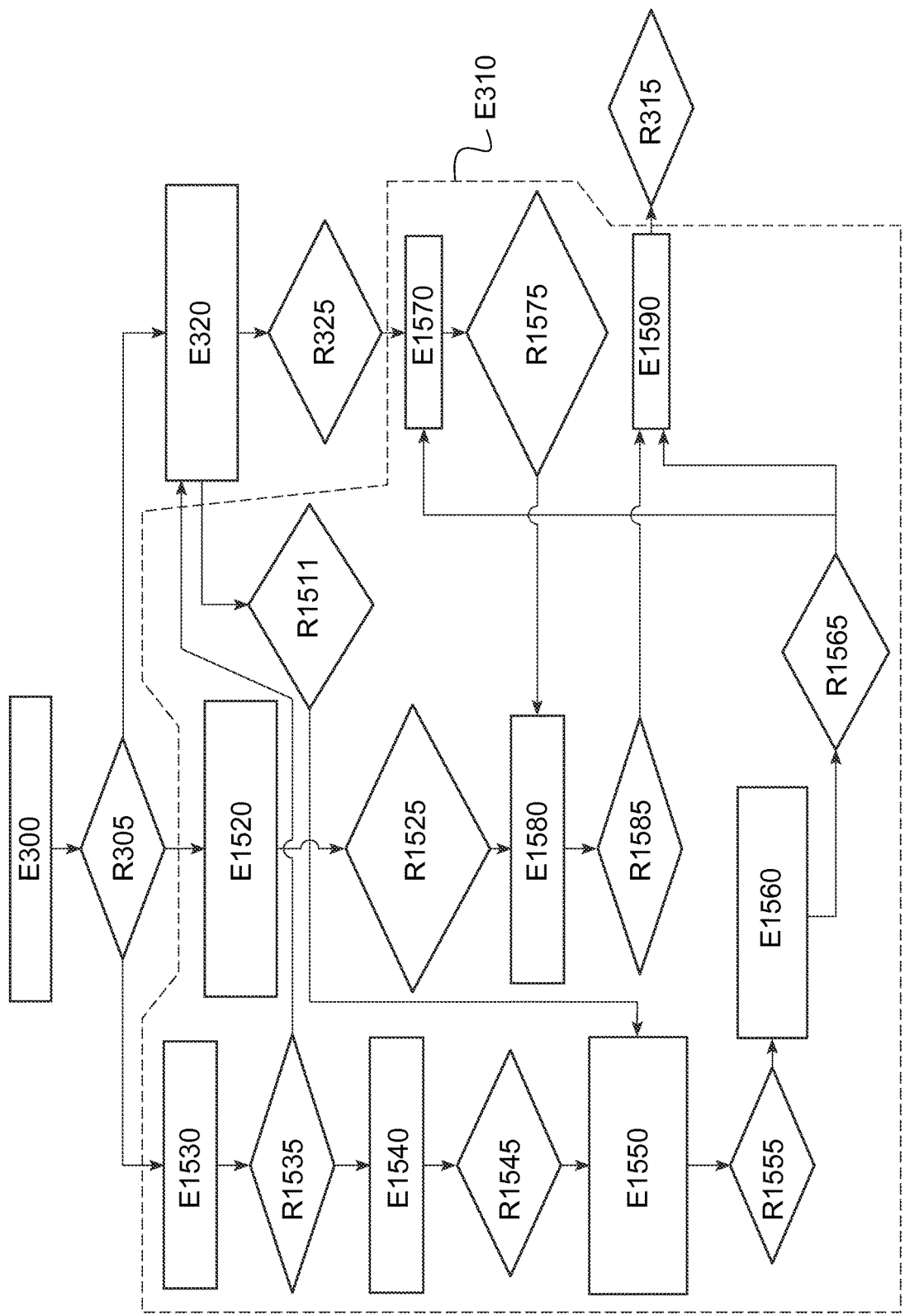
FIG. 15 illustrates an example of the decoding method that can be implemented by the second variant of the decoding module.

FIGS. 14 and 15 relate to a second embodiment of the enhancement layer decoding module 170 and an example of a decoding method for this enhancement layer that can be implemented by the module shown in FIG. 14, respectively. This second embodiment corresponds to the case in which the corresponding encoder 100 does not send to the decoder information representative of a spatial encoding resolution for at least one block.

As illustrated in FIG. 14, the decoding module 170 receives as an input a residue 135 representative of a block for the enhancement layer. An entropic decoding module 1410 is configured to implement an entropic decoding of the residue 135. A decoded residue 1415 is produced at the output of the entropic decoding module 1410. This latter performs a decoding as a function of spatial decoding resolution information 1445, relating to the block for the enhancement layer.

An inverse quantization module 1420 is adapted to perform an inverse quantization on the decoded residue, in order to produce a dequantized residue 1425. An inverse transformation module 1430 is adapted to apply an inverse transform (for example, an inverse DCT) to the dequantized residue to generate a residual block 1435 transmitted at the input of an adder 1460. This adder 1460 also receives as an input a block 1455 provided by an over-sampling module 1450.

This module 1450 over-samples a decoded block 165 for the base layer, corresponding to the considered block for the enhancement layer, at the spatial encoding resolution 1445 that it also receives as an input.

The adder 1460 can produce a decoded intermediate block 1435, at the spatial encoding resolution 1445.

Another over-sampling module 1470 is configured to over-sample the intermediate block to a final spatial resolution, if it is different from the spatial encoding resolution 1445, in order to obtain a final decoded block 175 for the enhancement layer at the final spatial resolution corresponding to the initial spatial resolution at the encoder (2N*2N in our example).

For this embodiment, the spatial encoding resolution information for the block is determined by a determination module 1440 as a function of a motion vector 167 provided by the base layer decoding module 160.

This motion vector points to a first reference block in a first reference frame (for example, base layer of a previously decoded frame), this first reference block being used to predict the block for the base layer 165. The determination module is adapted to scale the motion vector 167 in such a way that it points to a second reference block in a second reference frame (for example, the enhancement layer corresponding to the base layer forming the first reference frame). The determination means 1440 is then configured to infer the spatial encoding resolution from the second reference block in the same way as the module 900 of the encoding module of FIG. 9.

FIG. 15 is a flow diagram of an embodiment of a decoding method that can be implemented by the module of FIG. 14.

As already mentioned with reference to FIG. 3, the decoder receives encoded data R305 at step E300. Then, for at least one block of the base layer, the encoded data representative of this block are decoded at step E320 to obtain a decoded block R325 for the base layer.

At step E1530, a first reference frame R1535 (for example, base layer of a previously decoded frame) is obtained. This first reference frame is used for decoding E320 the data of the block of the base layer. At step E1540, a second reference frame R1545 is obtained from this first reference frame (for example, the enhancement layer corresponding to the base layer forming the first reference frame).

At step E1550, a second motion vector is obtained from a first motion vector R1511 used for decoding the data of the corresponding block for the base layer. This second motion vector points to a reference block R1555 in the second reference frame.

A spatial encoding resolution R1565 is determined at step E1560 from the spatial resolutions inferred based on the reference block R1555. As explained with reference to FIG. 9, the reference block overlapping several blocks in the second reference frame, these blocks having different spatial resolutions (forming a set of predetermined spatial resolutions), in this case the spatial encoding resolution can be inferred from the spatial resolution that is in majority. In another example, if among the different spatial resolutions, the presence of one of the spatial resolutions (for example, 2N*2N) is higher than a predetermined rate (for example, 30%), this spatial resolution can be preferred to infer the spatial resolution of the considered block.

At step E1520, the data representative of a block for the enhancement layer corresponding to the block decoded at step E320 are decoded. Data representative (residue) of the block for the enhancement layer R1525 are obtained. From these data R1580 is generated an intermediate block R1585 at step E1580. This intermediate block is over-sampled at step E1590 if its resolution is different from the encoding resolution R1565. The final decoded block R315 is obtained at the output.

Figure 16:
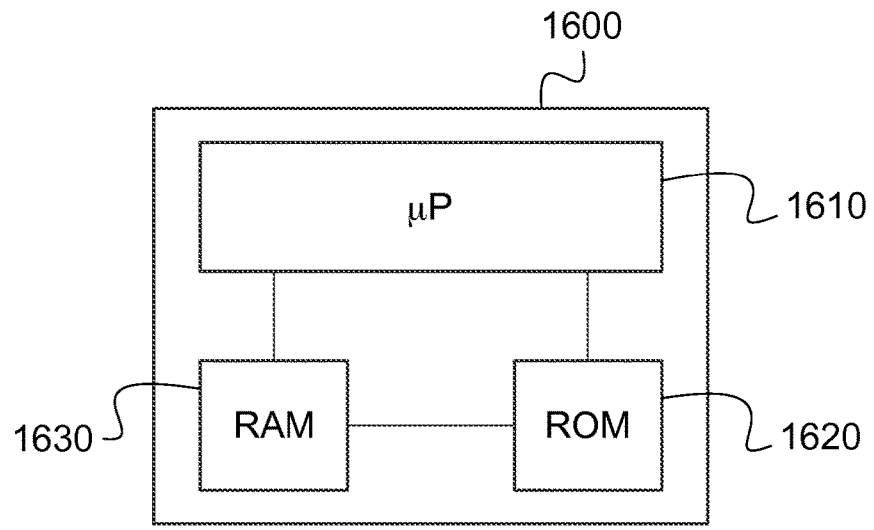
FIG. 16 illustrates an example of a possible implementation for an encoding or a decoding device according to the invention.

Reference is now made to FIG. 16 that illustrates a particular way, among several possibilities, to make a processing means 1600 (for an encoder or a decoder) configured to implement an embodiment of a method according to the invention. The processing means 1600 comprises a random-access memory 1630 (for example, a RAM), a processing unit 1610 equipped for example with a processor, and driven by a computer program stored into a read-only memory 1620 (for example, a ROM or a drive disk). At initialization, the code instructions of the computer program are for example loaded in the random-access memory 1630 before being executed by the processor of the processing unit 1610.

In other words, the computer program executed by the processor can include instructions for the implementation of an embodiment of an encoding or decoding method, as described hereinabove.

FIG. 16 illustrates only a particular way, among several possible, to make the processing means 1600 in such a way that they perform certain steps of the method according to the invention. Indeed, these steps can be carried out indifferently on a reprogrammable computing machine (a PC, a DSP or a microcontroller) executing a program comprising a sequence of instructions, or on dedicated computing machine (for example, a set of logical gates, such as an FPGA or an ASIC, or any other hardware module).

In the case where the processing means is made with a reprogrammable computing machine, the corresponding program (i.e. the sequence of instructions) can be stored into a storage medium, removable or not, this storage medium being partially or totally readable by a computer or a processor. In other words, a computer program comprising program code instructions for executing the steps of a encoding or decoding embodiment as described hereinabove, can be recorded on a computer-readable recording medium.

It goes without saying that the modes of implementation and embodiments described hereinabove have been given for information purposes only and are in no way limitative, and that many changes can be easily made by the person skilled in the art without departing from the scope of the invention.

The invention claimed is:

1. A method for encoding data corresponding to a video sequence, into a spatial resolution scalable binary flow, comprising a base layer and at least one enhancement layer, the method comprising for at least one given frame of the video sequence:
    obtaining, from said given frame, a first frame, partitioning the first frame into blocks, each said block of the first frame having a given size, and encoding at least one said block of the first frame to generate the base layer,
    obtaining, from said given frame, a second frame, the method further comprising:
    partitioning said second frame into blocks of the second frame by inferring the initial size of at least one of the blocks of the second frame from a size of a corresponding said block of the first frame, said at least one said block of the second frame having an initial spatial resolution,
    determining a spatial encoding resolution associated with said at least one said block of the second frame from a set of predetermined spatial resolutions, and
    encoding data representative of said at least one block of the second frame, based on the determined spatial encoding resolution, to generate the at least one enhancement layer,
    wherein the step of encoding said data representative of said at least one block of the second frame comprises:
    sub-sampling said at least one block of the second frame to obtain an intermediate block at a given spatial encoding resolution, if the given spatial encoding resolution is lower than the initial spatial resolution,
    over-sampling to said given spatial encoding resolution the block of the first frame corresponding to said block of the second frame, if the spatial resolution of said block of the base layer is lower than said spatial encoding resolution of said block of the second frame, determining the data representative of said at least one block of the second frame as a function of the over-sampled block of the first frame and said at least one sub-sampled block of the second frame, and coding said data representative of said at least one block of the second frame.

2. The method according to claim 1, wherein said set of predetermined spatial resolutions includes at least said initial spatial resolution.

3. The encoding method according to claim 2, wherein the step of determining the spatial encoding resolution of the block of the second frame comprises:

evaluating a rate-distortion cost for said block of the second frame for at least two predetermined said spatial resolutions, and determining the spatial encoding resolution of the block of the second frame as a function of the evaluated rate-distortion costs.

4. The encoding method according to claim 3, wherein the determined spatial encoding resolution is associated with a lowest of the evaluated rate-distortion costs.

5. The method according to claim 4, wherein the step of encoding at least one said block of the first frame comprises:

obtaining, from a reference frame, a first reference frame that is at least one portion of the reference frame, and determining in the first reference frame, a first prediction block and a first motion vector pointing to the first prediction block, and wherein the step of determining the spatial encoding resolution of said block of the second frame comprises:

obtaining, from said reference frame, at least a second reference frame that is at least one portion of the reference frame, obtaining, from the first motion vector, a second motion vector pointing to a second reference block, in said second reference frame, said second reference block being associated with at least one predetermined said spatial resolution, and determining the spatial encoding resolution of said block of the second frame from at least one said predetermined spatial resolution of the second reference block.

6. The encoding method according to claim 3, further comprising:

analyzing content of said block of the second frame, and identifying those one or more of the predetermined spatial resolutions that has a said rate-distortion cost lower than a predetermined threshold, and if said one or more of the identified predetermined spatial resolutions is adapted to the analyzed content of said block of the second frame, determining the spatial encoding resolution from said adapted spatial resolution, otherwise determining the spatial encoding resolution from said one or more of the identified predetermined spatial resolution having a lowest said evaluated rate-distortion cost.

7. The encoding method according to claim 6, wherein the step of determining the spatial encoding resolution of the block of the second frame further comprises:

if no said spatial resolution is adapted to the analyzed content of said block of the second frame, performing a comparison between said one or more of the identified predetermined spatial resolutions and the spatial resolution of at least one encoded block of a neighborhood, and if a result of the comparison fulfills a predetermined criterion, determining the spatial encoding resolution for said block from the spatial resolution of the encoded block of the neighborhood, otherwise determining the spatial encoding resolution from said one or more of the identified predetermined spatial resolution having a lowest said evaluated rate-distortion cost.

8. The method according to claim 6, wherein the step of encoding at least one said block of the first frame comprises:

obtaining, from a reference frame, a first reference frame that is at least one portion of the reference frame, and determining in the first reference frame, a first prediction block and a first motion vector pointing to the first prediction block, and wherein the step of determining the spatial encoding resolution of said block of the second frame comprises:

obtaining, from said reference frame, at least a second reference frame that is at least one portion of the reference frame, obtaining, from the first motion vector, a second motion vector pointing to a second reference block, in said second reference frame, said second reference block being associated with at least one predetermined said spatial resolution, and determining the spatial encoding resolution of said block of the second frame from at least one said predetermined spatial resolution of the second reference block.

9. The encoding method according to claim 3, wherein the step of determining the spatial encoding resolution of the block of the second frame further comprises:

identifying those one or more of the predetermined spatial resolutions that has a said rate-distortion cost lower than a predetermined threshold, and performing a comparison between said one or more of the identified predetermined spatial resolutions and the spatial resolution of at least one encoded block of the second frame belonging to a neighborhood of said block of the second frame, and if a result of the comparison fulfills a predetermined criterion, determining the spatial encoding resolution for said block of the second frame from the spatial resolution of the encoded block of the neighborhood, otherwise determining the spatial encoding resolution from said one or more of the identified predetermined spatial resolution having a lowest said evaluated rate-distortion cost.

10. The method according to claim 9, wherein the step of encoding at least one said block of the first frame comprises:

obtaining, from a reference frame, a first reference frame that is at least one portion of the reference frame, and determining in the first reference frame, a first prediction block and a first motion vector pointing to the first prediction block, and wherein the step of determining the spatial encoding resolution of said block of the second frame comprises:

obtaining, from said reference frame, at least a second reference frame that is at least one portion of the reference frame, obtaining, from the first motion vector, a second motion vector pointing to a second reference block, in said second reference frame, said second reference block being associated with at least one predetermined said spatial resolution, and determining the spatial encoding resolution of said block of the second frame from at least one said predetermined spatial resolution of the second reference block.

11. The method according to claim 3, wherein the step of encoding at least one said block of the first frame comprises:

obtaining, from a reference frame, a first reference frame that is at least one portion of the reference frame, and determining in the first reference frame, a first prediction block and a first motion vector pointing to the first prediction block, and wherein the step of determining the spatial encoding resolution of said block of the second frame comprises:

obtaining, from said reference frame, at least a second reference frame that is at least one portion of the reference frame, obtaining, from the first motion vector, a second motion vector pointing to a second reference block, in said second reference frame, said second reference block being associated with at least one predetermined said spatial resolution, and determining the spatial encoding resolution of said block of the second frame from at least one said predetermined spatial resolution of the second reference block.

12. The encoding method according to claim 1, wherein the step of encoding at least one said block of the first frame comprises:

obtaining, from a reference frame, a first reference frame that is at least one portion of the reference frame, and determining in the first reference frame, a first prediction block and a first motion vector pointing to the first prediction block, and wherein the step of determining the spatial encoding resolution of said block of the second frame comprises:

obtaining, from said reference frame, at least a second reference frame that is at least one portion of the reference frame, obtaining, from the first motion vector, a second motion vector pointing to a second reference block, in said second reference frame, said second reference block being associated with at least one predetermined said spatial resolution, and determining the spatial encoding resolution of said block of the second frame from at least one said predetermined spatial resolution of the second reference block.

13. The encoding method according to claim 12, wherein said second reference block having a predetermined said spatial resolution, the spatial encoding resolution of the block of the second frame is inferred from said predetermined spatial resolution of the second reference block.

14. The encoding method according to claim 12, wherein the spatial encoding resolution of said block of the second frame is determined from the majority predetermined spatial resolution associated with the second reference block.

15. The encoding method according to claim 12, wherein, if a proportion of a predetermined spatial resolution associated with the second reference block is higher than a predetermined threshold, the spatial encoding resolution of said block of the second frame is determined from said predetermined spatial resolution, otherwise the spatial encoding resolution of said block of the second frame is determined from the majority predetermined spatial resolution associated with the second reference block.

16. A method for decoding a spatial resolution scalable binary flow, comprising a base layer and at least one enhancement layer, including encoded data corresponding to a video sequence, the method comprising for at least one given block of a frame of the video sequence:

decoding data corresponding to the given block for the at least one enhancement layer to obtain decoded data representative of the given block for the at least one enhancement layer, and decoding spatial resolution information, representative of a spatial encoding resolution of said given block for the at least one enhancement layer, decoding data corresponding to the given block for the base layer to obtain a decoded block for the base layer, performing a first over-sampling of the decoded block for the base layer as a function of said decoded spatial resolution information, obtaining an intermediate decoded block for the at least one enhancement layer from the decoded data representative of the given block for the enhancement layer and of the over-sampled decoded block for the base layer, and performing a second over-sampling of the intermediate decoded block for the at least one enhancement layer from said spatial resolution information to produce a final decoded block at a final spatial resolution, for the at least one enhancement layer.

17. A method for decoding a spatial resolution scalable binary flow, comprising a base layer and at least one enhancement layer, including encoded data corresponding to a video sequence, the method comprising for at least one given block of a frame of the video sequence:

decoding data corresponding to the given block for the base layer to obtain a decoded block for the base layer, decoding the encoded data corresponding to the given block for the at least one enhancement layer to obtain decoded data representative of the block for the at least one enhancement layer, said step of decoding further comprising obtaining, from a reference frame, a first reference frame, the first reference frame being at least a portion of the reference frame, obtaining, from the binary flow, a first motion vector pointing to a first prediction block in the first reference frame, obtaining, from said reference frame, a second reference frame, the second reference frame being at least a portion of the reference frame, at least one block of the second reference frame having a determined spatial resolution, obtaining, from the first motion vector, a second motion vector pointing to a second reference block, in said second reference frame, determining a spatial encoding resolution of said block of the second reference frame from the spatial resolution of the second reference block, performing a first over-sampling of the decoded block for the base layer, as a function of the spatial encoding resolution, obtaining an intermediate decoded block at the spatial encoding resolution for the at least one enhancement layer from the decoded data representative of the block for the at least one enhancement layer and the over-sampled decoded block for the base layer, and performing a second over-sampling of the intermediate decoded block for the at least one enhancement layer to produce a final decoded block at a final spatial resolution, for the at least one enhancement layer.

18. A device for encoding data corresponding to a video sequence, into a spatial resolution scalable binary flow, comprising a base layer and at least one enhancement layer, the device being configured to perform for at least one given frame of the video sequence:

obtaining, from said given frame, a first frame, partitioning the first frame into blocks, each said block having a given size, and encoding at least one said block of the first frame to generate the base layer, obtaining, from said given frame, a second frame, the device being further configured to perform partitioning the second frame into blocks by inferring an initial size of at least one of the blocks of the second frame from a size of a corresponding said block in the first frame, said at least one block of the second frame having an initial spatial resolution, determining a spatial encoding resolution associated with said at least one block of the second frame from a set of predetermined spatial resolutions, and encoding data representative of said at least one block of the second frame, based on the determined spatial encoding resolution, to generate at least one enhancement layer, wherein the encoding said data representative of said at least one block of the second frame comprises:

sub-sampling said at least one block of the second frame to obtain an intermediate block at a given spatial encoding resolution, if the given spatial encoding resolution is lower than the initial spatial resolution, over-sampling to said given spatial encoding resolution the block of the first frame corresponding to said block of the second frame, if the spatial resolution of said block of the base layer is lower than said spatial encoding resolution of said block of the second frame, determining the data representative of said at least one block of the second frame as a function of the over-sampled block of the first frame and said at least one sub-sampled block of the second frame, and coding said data representative of said at least one block of the second frame.

19. A device for decoding a spatial resolution scalable binary flow, comprising a base layer and at least one enhancement layer, including encoded data corresponding to a video sequence, the device being configured to perform for at least one given block of a frame of the video sequence:

decoding the data corresponding to the given block for the at least one enhancement layer to obtain decoded data representative of the given block for the at least one enhancement layer, and decoding spatial resolution information, representative of a spatial encoding resolution of said given block for the at least one enhancement layer, decoding the data corresponding to the given block for the base layer to obtain a decoded block for the base layer, performing a first over-sampling of the decoded block for the base layer as a function of said decoded spatial resolution information, obtaining an intermediate decoded block for the at least one enhancement layer from the decoded data representative of the given block for the at least one enhancement layer and of the over-sampled decoded block for the base layer, and performing a second over-sampling of the intermediate decoded block for the at least one enhancement layer from said spatial resolution information to produce a final decoded block at a final spatial resolution, for the at least one enhancement layer.

20. A device for decoding a spatial resolution scalable binary flow, comprising a base layer and at least one enhancement layer, including encoded data corresponding to a video sequence, the device being configured to perform for at least one given block of a frame of the video sequence:

decoding the encoded data corresponding to the given block for the base layer to obtain a decoded block for the base layer, decoding the encoded data corresponding to the given block for the at least one enhancement layer to obtain decoded data representative of the given block for the at least one enhancement layer, said decoding device being further configured to perform:

obtaining, from a reference frame, a first reference frame, the first reference frame being at least a portion of the reference frame, obtaining, from the binary flow, a first motion vector pointing to a first prediction block in the first reference frame, obtaining, from said reference frame, a second reference frame, the second reference frame being at least a portion of the reference frame, at least one block of the second reference frame having a determined spatial resolution, obtaining, from the first motion vector, a second motion vector pointing to a second reference block, in said second reference frame, determining a spatial encoding resolution of said block of the second reference frame from the spatial resolution of the second reference block, performing a first over-sampling of the decoded block for the base layer, as a function of the spatial encoding resolution, obtaining an intermediate decoded block at the spatial encoding resolution for the at least one enhancement layer from the decoded data representative of the block for the at least one enhancement layer and the over-sampled decoded block for the base layer, and performing a second over-sampling of the intermediate decoded block for the at least one enhancement layer to produce a final decoded block at a final spatial resolution, for the at least one enhancement layer.

* * * * *